(12) United States Patent
Tasaki et al.

(10) Patent No.: US 11,924,225 B2
(45) Date of Patent: Mar. 5, 2024

(54) INFORMATION PROCESSING APPARATUS, INFORMATION PROCESSING METHOD, AND RECORDING MEDIUM

(71) Applicant: Panasonic Intellectual Property Corporation of America, Torrance, CA (US)

(72) Inventors: Hajime Tasaki, Osaka (JP); Takamitsu Sasaki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 666 days.

(21) Appl. No.: 17/096,437

(22) Filed: Nov. 12, 2020

(65) Prior Publication Data

US 2021/0067528 A1 Mar. 4, 2021

Related U.S. Application Data

(63) Continuation of application No. PCT/JP2019/027119, filed on Jul. 9, 2019.
(Continued)

(30) Foreign Application Priority Data

Mar. 27, 2019 (JP) ................................. 2019-061994

(51) Int. Cl.
*H04L 29/06* (2006.01)
*H04L 9/40* (2022.01)
(Continued)

(52) U.S. Cl.
CPC ...... *H04L 63/1416* (2013.01); *H04L 63/1441* (2013.01); *H04W 4/40* (2018.02); *H04W 12/121* (2021.01)

(58) Field of Classification Search
CPC .. H04L 63/1416; H04L 63/1441; H04W 4/40; H04W 12/121
See application file for complete search history.

(56) References Cited

U.S. PATENT DOCUMENTS 9,099,006 B2* 8/2015 Mudalige .............. B60W 10/20
11,115,425 B2* 9/2021 Ando .................. H04L 63/1425
(Continued)

FOREIGN PATENT DOCUMENTS

JP 2018-77607 5/2018

OTHER PUBLICATIONS

International Search Report (ISR) dated Oct. 8, 2019 in International (PCT) Application No. PCT/JP2019/027119.

*Primary Examiner* — Kambiz Zand
*Assistant Examiner* — Afaq Ali
(74) *Attorney, Agent, or Firm* — Wenderoth, Lind & Ponack, L.L.P.

(57) ABSTRACT

An information processing apparatus connected to one or more vehicles and a threat information server storing pieces of threat information. The information processing apparatus includes: a processor; and a memory including at least one set of instructions that, when executed by the processor, causes the processor to perform: obtaining a detection result of an attack on one of the vehicles; (a) determining whether the attack is included in any one of the pieces of threat information; (b) when the attack is included therein, determining whether the resolution state to the attack included in the one of the pieces of threat information indicates that the attack has not been resolved or has been resolved; (c) deciding a processing priority level of the attack, based on a determination result in (a) and a determination result in (b); and (d) outputting the processing priority level decided.

11 Claims, 18 Drawing Sheets

Related U.S. Application Data

(60) Provisional application No. 62/746,852, filed on Oct. 17, 2018.

(51) Int. Cl.
*H04W 4/40* (2018.01)
*H04W 12/12* (2021.01)
*H04W 12/121* (2021.01)

(56) References Cited

U.S. PATENT DOCUMENTS

| | | | |
|---|---|---|---|
| 2008/0270886 A1* | 10/2008 | Gossweiler | H04N 21/482 |
| | | | 715/227 |
| 2011/0066896 A1* | 3/2011 | Ebina | G06F 13/385 |
| | | | 714/E11.179 |
| 2018/0096140 A1* | 4/2018 | Bulygin | G06F 21/52 |
| 2018/0337939 A1* | 11/2018 | Agarwal | G06F 16/26 |
| 2018/0351980 A1* | 12/2018 | Galula | H04L 63/1416 |
| 2019/0077217 A1* | 3/2019 | Yu | B60H 1/0073 |
| 2020/0034574 A1* | 1/2020 | Baltes | H04W 4/50 |
| 2021/0044612 A1* | 2/2021 | Kawauchi | B60W 50/0225 |

\* cited by examiner

FIG. 10

| ATTACK DETECTION RESULT ID | VEHICLE ID | VEHICLE MODEL | ATTACK DATE AND TIME | ATTACK TYPE | ATTACK CHANNEL | MESSAGE ID | ATTACK TARGET |
|---|---|---|---|---|---|---|---|
| B001 | CAR-100 | Model-A | 2018/05/01 | ATTACK A | OBD-II | 0xAA | ECU01 |
| B002 | CAR-151 | Model-A | 2018/05/01 | ATTACK B | Bluetooth | 0xBA | IVI |
| B003 | CAR-200 | Model-B | 2018/05/01 | ATTACK A | OBD-II | 0x36 | ECU02 |
| ... | ... | ... | ... | ... | ... | ... | ... |

FIG. 11

| COMPONENT MODEL | MANUFACTURER NAME | UPDATE DATE AND TIME | LATEST UPDATE INFORMATION |
|---|---|---|---|
| ECU01 | COMPANY AAA | 2018/01/03 | Ver.1.50 |
| ECU02 | COMPANY BBB | 2018/01/10 | Ver.2.20 |
| ECU03 | COMPANY CCC | 2018/03/25 | Ver.2.40 |
| ⋮ | ⋮ | ⋮ | ⋮ |

FIG. 12

| THREAT INFORMATION ID | RESOLUTION STATE | ATTACK DATE AND TIME | VEHICLE MODEL | ATTACK TYPE | ATTACK COUNT | ATTACK CHANNEL | MESSAGE ID | ATTACK TARGET |
|---|---|---|---|---|---|---|---|---|
| A0001 | RESOLVED | 2018/01/01 | Model-A | ATTACK A | 20 | OBD-II | 0xAA | ECU01 |
| A0002 | NOT RESOLVED | 2018/02/08 | Model-A | ATTACK B | 10 | Bluetooth | 0xBA | IVI |
| A0080 | RESOLVED | 2018/04/25 | Model-B | ATTACK A | 50 | OBD-II | 0x36 | ECU02 |
| ... | ... | ... | ... | ... | ... | ... | ... | ... |

FIG. 13

| VEHICLE ID | OWNER INFORMATION | RIDE COUNT | VEHICLE MODEL | MODEL OF COMPONENT 1 | FIRMWARE FOR COMPONENT 1 | MODEL OF COMPONENT 2 | FIRMWARE FOR COMPONENT 2 | ... | MODEL OF COMPONENT N | FIRMWARE FOR COMPONENT N |
|---|---|---|---|---|---|---|---|---|---|---|
| CAR-100 | Owner00A | 50 | Model-A | ECU01 | Ver.1.40 | ECU02 | Ver.2.10 | ... | ECU50 | Ver.3.20 |
| CAR-101 | Owner00B | 200 | Model-B | ECU03 | Ver.1.10 | ECU04 | Ver.2.01 | ... | ECU55 | Ver.3.30 |
| CAR-102 | Owner00Z | 140 | Model-A | ECU01 | Ver.1.20 | ECU02 | Ver.2.10 | ... | ECU60 | Ver.2.41 |
| ... | ... | ... | ... | ... | ... | ... | ... | ... | ... | ... |

FIG. 14

| ATTACK DETECTION RESULT ID | PROCESSING PRIORITY LEVEL | VEHICLE ID | VEHICLE MODEL | ATTACK DATE AND TIME | ATTACK TYPE | ATTACK CHANNEL | MESSAGE ID | ATTACK TARGET |
|---|---|---|---|---|---|---|---|---|
| B001 | HIGH | CAR-150 | Model-A | 2018/05/01 | ATTACK A | OBD-II | 0xAA | ECU01 |
| B002 | LOW | CAR-151 | Model-A | 2018/05/01 | ATTACK B | Bluetooth | 0xBA | IVI |
| B003 | MEDIUM | CAR-200 | Model-B | 2018/05/01 | ATTACK A | OBD-II | 0x36 | ECU02 |
| ... | ... | ... | ... | ... | ... | ... | ... | ... |

| Event ID | DATE AND TIME | PRIORITY LEVEL | ATTACK TARGET | ATTACK TYPE |
|---|---|---|---|---|
| 001 | 2018/3/31 18:11:01.0001 | HIGH | Device A | Attack01 |
| 002 | 2018/4/10 18:00:01.0001 | HIGH | Device B | Attack02 |
| 003 | 2018/4/10 18:00:01.0002 | HIGH | Device B | Attack02 |
| 004 | 2018/4/10 18:00:01.0003 | HIGH | Device B | Attack02 |
| 005 | 2018/4/10 18:00:01.0004 | HIGH | Device B | Attack02 |
| 006 | 2018/4/10 18:00:01.0006 | HIGH | Device B | Attack02 |
| 007 | 2018/4/10 18:00:01.0008 | HIGH | Device B | Attack02 |
| 008 | 2018/4/10 18:00:01.0009 | HIGH | Device B | Attack02 |
| 009 | 2018/4/15 12:30:10.0100 | HIGH | Device A | Attack01 |
| 010 | 2018/4/15 12:30:10.0101 | HIGH | Device A | Attack01 |
| 011 | 2018/4/16 15:45:31.0010 | HIGH | Device C | Attack01 |

FIG. 22B

| Event ID | | DATE AND TIME | PRIORITY LEVEL | ATTACK TARGET | ATTACK TYPE |
|---|---|---|---|---|---|
| 001 | | 2018/3/31 18:11:01.0001 | HIGH | Device A | Attack01 |
| | 009 | 2018/4/15 12:30:10.0100 | MEDIUM | Device A | Attack01 |
| | 010 | 2018/4/15 12:30:10.0101 | MEDIUM | Device A | Attack01 |
| 002 | | 2018/4/10 18:00:01.0001 | HIGH | Device B | Attack02 |
| | 003 | 2018/4/10 18:00:01.0002 | MEDIUM | Device B | Attack02 |
| | 004 | 2018/4/10 18:00:01.0003 | MEDIUM | Device B | Attack02 |
| | 005 | 2018/4/10 18:00:01.0004 | MEDIUM | Device B | Attack02 |
| | 006 | 2018/4/10 18:00:01.0006 | MEDIUM | Device B | Attack02 |
| | 007 | 2018/4/10 18:00:01.0008 | MEDIUM | Device B | Attack02 |
| | 008 | 2018/4/10 18:00:01.0009 | MEDIUM | Device B | Attack02 |
| 011 | | 2018/4/16 15:45:31.0010 | HIGH | Device C | Attack01 |

FIG. 22C

| Event ID | DATE AND TIME | PRIORITY LEVEL | ATTACK TARGET | ATTACK TYPE |
|---|---|---|---|---|
| 001 | 2018/3/31 18:11:01.0001 | HIGH | Device A | Attack01 |
| 002 | 2018/4/10 18:00:01.0001 | HIGH | Device B | Attack02 |
| 011 | 2018/4/16 15:45:31.0010 | HIGH | Device C | Attack01 |

INFORMATION PROCESSING APPARATUS, INFORMATION PROCESSING METHOD, AND RECORDING MEDIUM

CROSS REFERENCE TO RELATED APPLICATIONS

This application is a U.S. continuation application of PCT International Patent Application Number PCT/JP2019/027119 filed on Jul. 9, 2019, claiming the benefit of priority of U.S. Provisional Patent Application No. 62/746,852 filed on Oct. 17, 2018, and the benefit of priority of Japanese Patent Application Number 2019-061994 filed on Mar. 27, 2019, the entire contents of which are hereby incorporated by reference.

BACKGROUND

1. Technical Field

The present disclosure relates to an information processing apparatus, information processing method, and a recording medium which decide processing priority levels of attacks on vehicles.

2. Description of the Related Art

Conventionally, monitoring servers which monitor maintenance target systems including various kinds of Internet of Things (IoT) devices create detection results of attacks when the attacks were made on the maintenance target systems (for example, cyber attacks), and present the created detection results to analysts. The analysts can process the detection results of the attacks made on the maintenance target systems, and plan countermeasures against the attacks by, for example, updating security rules.

However, when a large number of attacks are made on the maintenance systems, a large number of detection results of the attacks are to be presented to the analysts. In this case, the analysts cannot determine which one of the large number of detection results presented should be processed preferentially, which may cause a trouble in analysis services.

For example, Patent Literature 1 (Japanese Unexamined Patent Application Publication No. 2018-77607) discloses an apparatus which evaluates priority levels of updates of security rules (for example, countermeasures against attacks) according to matching rates of a maintenance target system and threat information (for example, risks of the threat against the maintenance target system). This allows an analyst to preferentially process a detection result having a high priority level.

SUMMARY

However, according to the priority evaluation method disclosed in Patent Literature 1, when a large number of same attacks are made and the risks of the attacks are evaluated to be high and thus have a high processing priority level, a large number of detection results of the attacks are to be presented to the analyst. In other words, although the analyst can take countermeasures against the attacks by only processing one of the large number of detection results, the large number of detection results are evenly assigned with a high priority level and the large number of detection results are presented to the analyst. For this reason, the analyst has to take trouble of, for example, manually reassigning priority levels of the others assuming that the same remaining attacks do not need to be processed.

The present disclosure has an object to provide an information processing apparatus, etc. which make it possible to effectively decide processing priority levels of attacks on vehicles.

In order to achieve the above object, an information processing apparatus according to an aspect of the present disclosure is an information processing apparatus connected to one or more vehicles and a threat information server via a network, and the threat information server stores pieces of threat information each indicating an attack on a vehicle and a resolution state to the attack associated with each other. The information processing apparatus includes: a processor; and a memory including at least one set of instructions that, when executed by the processor, causes the processor to perform operations including: obtaining a detection result of an attack on one of the one or more vehicles connected to the information processing apparatus; (a) determining whether the attack indicated by the detection result is included in any one of the pieces of threat information stored in the threat information server; (b) when the attack indicated by the detection result is included in any one of the pieces of threat information, determining whether the resolution state to the attack indicated by the detection result included in the one of the pieces of threat information indicates that the attack has not been resolved or indicates that the attack has been resolved; (c) deciding a processing priority level of the attack indicated by the detection result, based on a determination result obtained in operation (a) and a determination result obtained in operation (b); and (d) outputting the processing priority level decided in operation (c).

In order to achieve the above object, an information processing method according to an aspect of the present disclosure is an information processing method executed by a processor included in an information processing apparatus. The information processing apparatus is connected to one or more vehicles and a threat information server via a network. The threat information server storing pieces of threat information each indicating an attack on a vehicle and a resolution state to the attack associated with each other. The information processing method including the steps of obtaining a detection result of an attack on one of the one or more vehicles connected to the information processing apparatus; (i) determining whether the attack indicated by the detection result is included in any one of the pieces of threat information stored in the threat information server; (ii) when the attack indicated by the detection result is included in any one of the pieces of threat information, determining whether the resolution state to the attack indicated by the detection result included in the one of the pieces of threat information indicates that the attack has not been resolved or indicates that the attack has been resolved; deciding a processing priority level of the attack indicated by the detection result, based on a determination result obtained in step (i) and a determination result obtained in step (ii); and outputting the processing priority level decided.

In order to achieve the above object, a recording medium according to an aspect of the present disclosure is a non-transitory computer-readable recording medium having a program for causing the information processing apparatus to execute the information processing method recorded thereon.

According to the present disclosure, it is possible to effectively decide processing priority levels of attacks on vehicles.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 10 is a diagram indicating one example of a data structure of detection results before processing priority levels are being associated therewith.

FIG. 11 is a diagram indicating one example of a data structure of latest information of countermeasures against attacks.

FIG. 12 is a diagram indicating one example of a data structure of thread information.

FIG. 13 is a diagram indicating one example of a data structure of vehicle information.

FIG. 14 is a diagram indicating one example of a data structure of detection results after processing priority levels are being associated therewith.

FIG. 22B is a diagram indicating one example of content displayed in the display unit according to the embodiment.

FIG. 22C is a diagram indicating another one example of content displayed in the display unit according to the embodiment.

DETAILED DESCRIPTION OF THE EMBODIMENTS

Embodiment

Hereinafter, an information processing system according to an embodiment is described with reference to the drawings.

[Configuration of Information Processing System 1]

Figure 1:
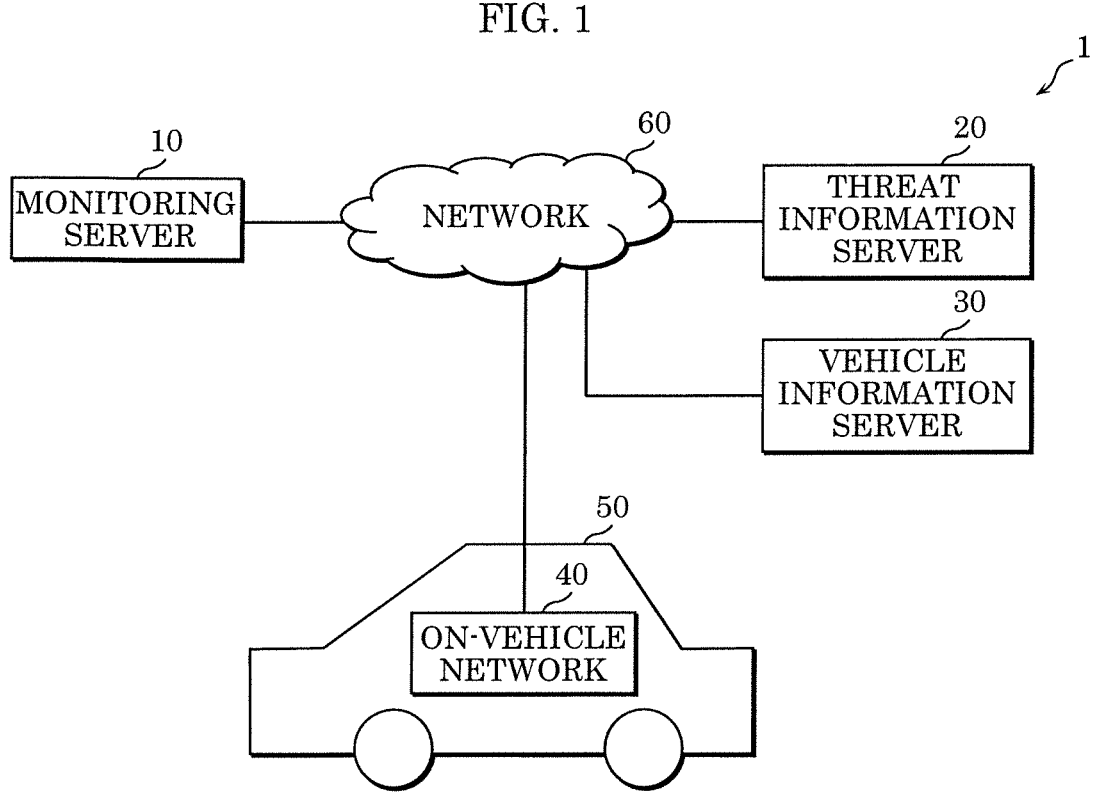
FIG. 1 is a configuration diagram of an information processing system according to an embodiment.

FIG. 1 is a configuration diagram of information processing system 1 according to the embodiment.

Information processing system 1 is a system for resolving threat such as cyber attacks, etc. on vehicles. In information processing system 1, the following elements are connected via network 60 which is a broad-band network such as the Internet: monitoring server 10; vehicle 50 (specifically, on-vehicle network 40 mounted on vehicle 50); threat information server 20 which stores pieces of threat information each indicating an attack on a vehicle and a resolution state to the attack associated with each other, and vehicle information server 30 which stores vehicle information including at least a countermeasure application state of vehicle 50 against the attack on the vehicle. It is to be noted that a vehicle connected to monitoring server 10 (information processing apparatus 100 included in monitoring server 10 as will be described later) via network 50 is referred to as vehicle 50, and general vehicles unlimited to vehicle 50 are referred to as vehicles without reference signs. For example, attacks on the general vehicles are referred to as attacks on the vehicles, and an attack on vehicle 50 connected to monitoring server 10 (information processing apparatus 100) is referred to as an attack on vehicle 50.

[Configuration of On-Vehicle Network 40]

Figure 2:
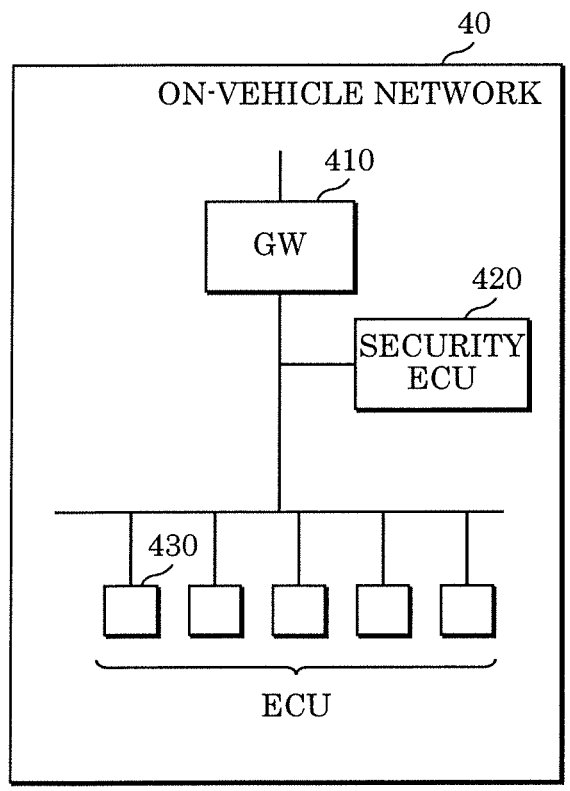
FIG. 2 is a configuration diagram of an on-vehicle network according to the embodiment.

FIG. 2 is a configuration diagram of on-vehicle network 40 according to the embodiment.

On-vehicle network 40 performs communication according to a protocol such as Controller Area Network (CAN). It is to be noted that on-vehicle network 40 may be a communication network based on Ethernet (registered trademark), FlexRay (registered trademark), or the like, without being limited to CAN.

On-vehicle network 40 is configured to include, for example, gateway (GW) 410, various kinds of Electronic Control Units (ECUs), and a bus (for example, a CAN bus). It is to be noted that GW 410 is also an ECU of a kind. Various kinds of ECUs include security ECU 420 and various ECUs 430. ECUs 430 include, for example, ECUs related to steering, brakes, engine, doors, windows, etc.

ECUs are devices including a processor, a digital circuit such as a memory, an analogue circuit, a communication circuit, etc. Memories include ROMs, RAMs, etc., and each memory can store a program which is executed by a processor. For example, various kinds of functions of ECUs are implemented by the processor operating according to the program. For example, ECUs send and receive data via a bus in an on-vehicle network according to the CAN protocol.

Each ECU sends and receives the data according to the CAN protocol to and from the bus. For example, the ECU receives data sent by another ECU from the bus, generates data including content to be sent to the other ECU, and sends the data to the bus. More specifically, each ECU performs processing according to the content of the data received, generates, for example, data indicating states of devices, a sensor, etc. connected to the ECU, or data of indicators (control values) to one or more of the other ECUs.

GW 410 has a function for transferring data which flows in the bus in on-vehicle network 40 in on-vehicle network 40. In addition, GW 410 sends data which flows in on-vehicle network 40 to network 60, and receives the data from network 60. Details of GW 410 are described with reference to FIG. 4 to be described later.

Security ECU 420 has a function for detecting anomaly in on-vehicle network 40. Details of security ECU 420 are described with reference to FIG. 3.

[Configuration of Security ECU 420]

Figure 3:
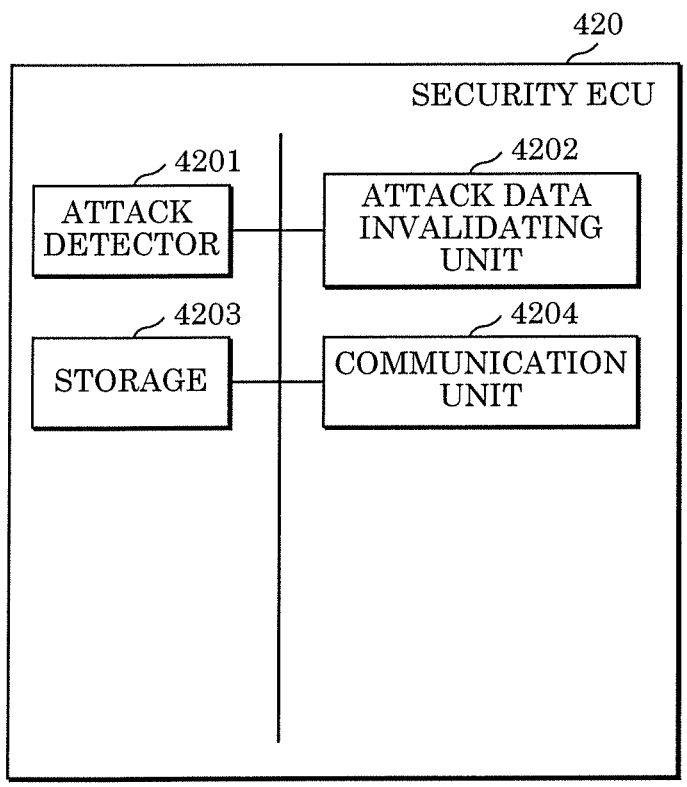
FIG. 3 is a configuration diagram of a security ECU according to the embodiment.

FIG. 3 is a configuration diagram of security ECU 420 according to the embodiment.

Security ECU 420 includes attack detector 4201, attack data invalidating unit 4202, storage 4203, and communication unit 4204.

Communication unit 4204 is a communication circuit which receives data which flows in the bus in on-vehicle network 40, and sends data to the bus.

Attack detector 4201 detects an attack on on-vehicle network 40, based on data flowing in the bus in on-vehicle network 40 received via communication unit 4204. It is to be noted that an attack on on-vehicle network 40 may be referred to as an attack on vehicle 50 hereinafter. For example, security ECU 420 has determination rules for determining whether there has been an attack, and attack detector 4201 detects the attack on on-vehicle network 40 by comparing the data which is received from the bus with the determination rules. More specifically, attack detector 4201 detects an attack on vehicle 50 assuming that vehicle 50 has been attacked when there is an anomaly in sending cycle of data flowing in the bus or there is an anomaly in an indicator value included in the data flowing in the bus.

Attack data invalidating unit 4202 sends invalidation information (for example, an error frame) to the bus via communication unit 4204 in order to invalidate the data determined to be an anomaly. In this way, the data determined to be an anomaly can be invalidated.

Storage 4203 stores the detection result of the attack on vehicle 50. The detection result stored is sent to the bus toward GW 410 via communication unit 4204.

[Configuration of GW 410]

Figure 4:
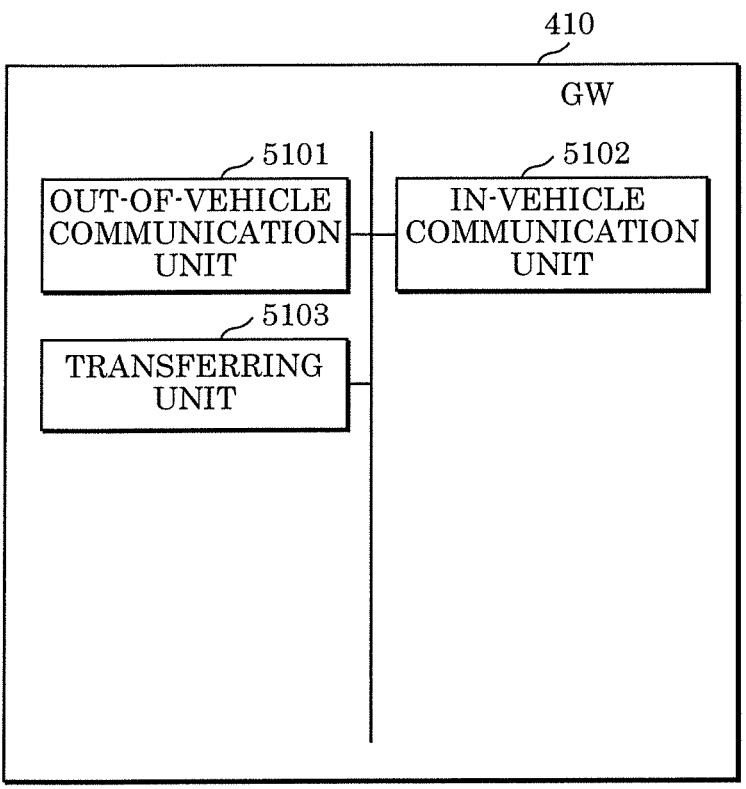
FIG. 4 is a configuration diagram of a GW according to the embodiment.

FIG. 4 is a configuration diagram of GW 410 according to the embodiment.

GW 410 includes out-of-vehicle communication unit 5101, in-vehicle communication unit 5102, and transferring unit 5103.

Out-of-vehicle communication unit 5101 is a communication circuit for communicating with devices outside vehicle 50, sends data to network 60, and receives data from network 60.

In-vehicle communication unit 5102 is a communication circuit for communicating with devices in on-vehicle network 40, receives data from the bus, and sends data to the bus.

Transferring unit 5103 transfers data received from one of a plurality of buses to the other one or more buses. The plurality of buses are connected to GW 410 via in-vehicle communication unit 5102. In addition, transferring unit 5103 transfers data received from the bus via in-vehicle communication unit 5102 to network 60 via out-of-vehicle communication unit 5101. For example, transferring unit 5103 sends a result of a detection by security ECU 420 received from the bus to network 60 (the result is, specifically, a result of the detection stored in storage 4203 in security ECU 420).

It is to be noted that GW 410 may be a security GW having a function of security ECU 420. In other words, on-vehicle network 40 may not include security ECU 420, and GW 410 may further include attack detector 4201, attack data invalidating unit 4202, and storage 4203 which are functional constituent elements of security ECU 420.

[Configuration of Monitoring Server 10]

Figure 5:
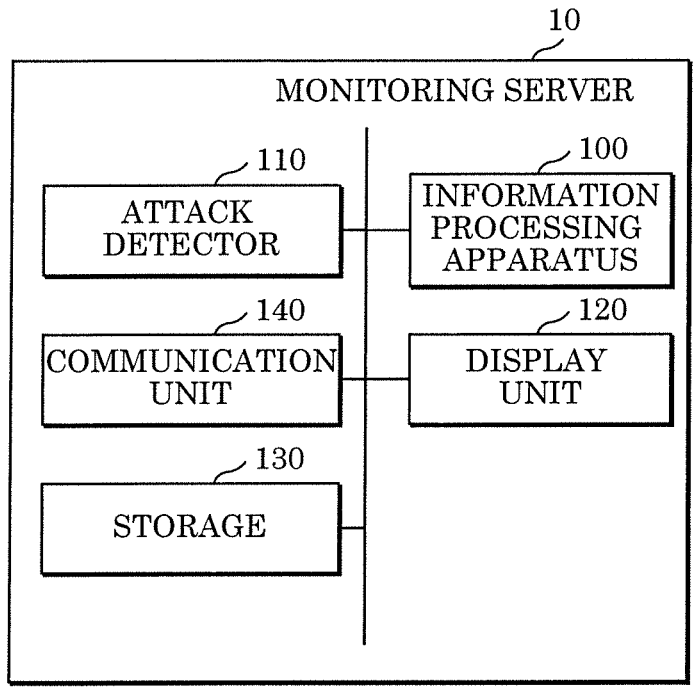
FIG. 5 is a configuration diagram of a monitoring server according to the embodiment.

FIG. 5 is a configuration diagram of monitoring server 10 according to the embodiment.

Monitoring server 10 includes information processing apparatus 100, attack detector 110, display unit 120, storage 130, and communication unit 140. Each of these constituent elements is implemented as a communication circuit in monitoring server 10, a display device such as a display, etc., a memory, a processor which executes a program stored in the memory, or the like.

Information processing apparatus 100 is a unique element of the present disclosure, and is a device capable of effectively deciding a processing priority level of an attack on vehicle 50. Details of information processing apparatus 100 are described with reference to FIG. 6 to be described later.

Communication unit 140 communicates with vehicle 50, threat information server 20, and vehicle information server 30 via network 60.

Attack detector 110 performs thorough analysis, etc. of the result of the detection received from vehicle 50 via communication unit 140, and detects further details of the attack on vehicle 50. It is to be noted that vehicle 50 does not always need to have a function for detecting an attack on vehicle 50. In this case, vehicle 50 sends a log of data which flows in on-vehicle network 40 to monitoring server 10, and attack detector 110 detects the attack on vehicle 50 based on the log.

Display unit 120 is a display device which displays the detection result of the attack on vehicle 50. The content which is displayed in display unit 120 is described with reference to FIGS. 22B and 22C to be described later.

Storage 130 stores the detection result of the attack on vehicle 50. The detection result in attack detector 110 is, for example, stored in storage 130 once, and then a processing priority level of the detection result which is output from information processing apparatus 100 is associated therewith. A data structure of detection results before being associated with processing priority levels is described with reference to FIG. 10 to be described later, and a data structure of the detection results associated with the processing priority levels is described with reference to FIG. 14 to be described later.

Although information processing apparatus 100 is an apparatus included in monitoring server 10 in FIG. 5, it is to be noted that information processing apparatus 100 may also have functions of monitoring server 10. In other words, information processing apparatus 100 may include attack detector 110, display unit 120, storage 130, and communication unit 140. Hereinafter, descriptions are given assuming that information processing apparatus 100 further includes the functions (attack detector 110, display unit 120, storage 130, and communication unit 140) of monitoring server 10 in addition to the functions indicated in FIG. 6.

[Configuration of Information Processing Apparatus 100]

Figure 6:
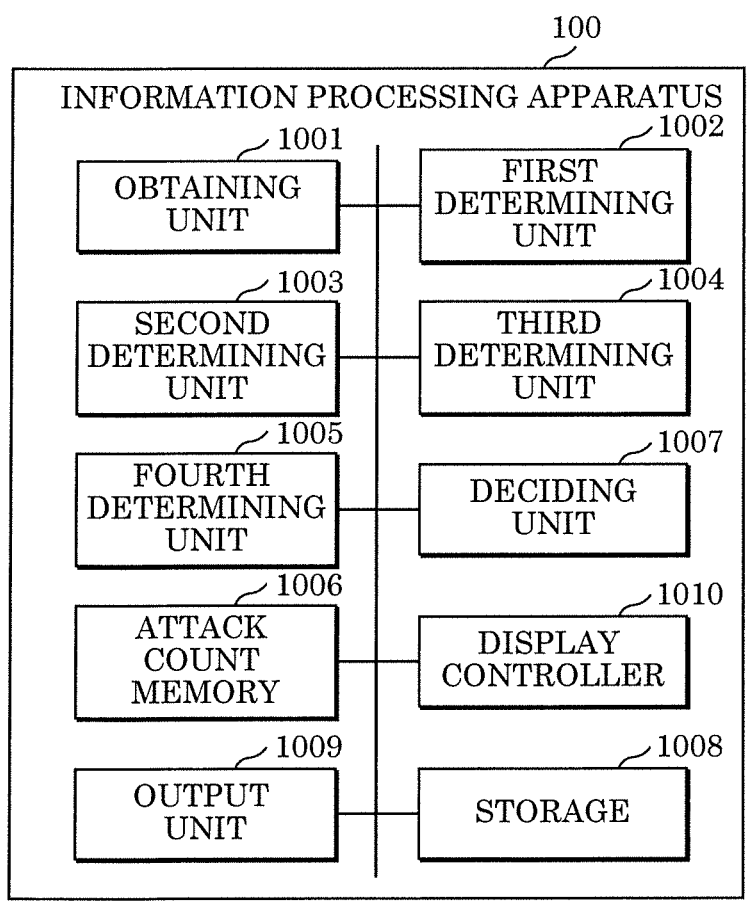
FIG. 6 is a configuration diagram of an information processing apparatus according to the embodiment.

FIG. 6 is a configuration diagram of information processing apparatus 100 according to the embodiment.

Information processing apparatus 100 is an apparatus connected, via a network, to: vehicle 50; threat information server 20 which stores pieces of threat information each indicating an attack on a vehicle and a resolution state to the attack associated with each other; and vehicle information server 30 which stores vehicle information including at least a countermeasure application state of vehicle 50 against the attack on the vehicle.

Information processing apparatus 100 includes obtaining unit 1001, first determining unit 1002, second determining unit 1003, third determining unit 1004, fourth determining unit 1005, attack count memory 1006, deciding unit 1007, storage 1008, output unit 1009, and display controller 1010. The respective constituent elements are described together with the descriptions of operations performed by information processing apparatus 100 with reference to FIG. 7.

Figure 7:
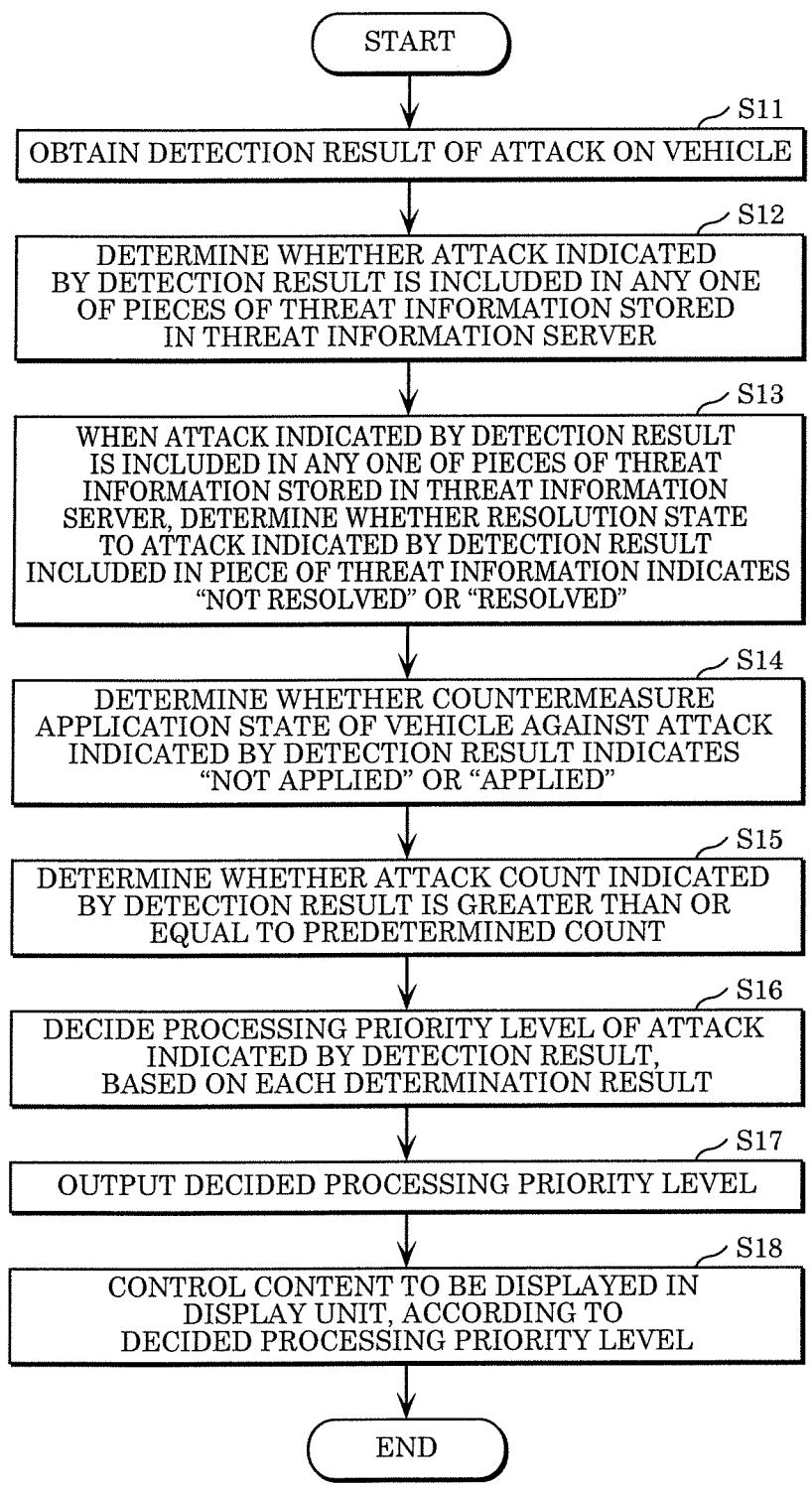
FIG. 7 is a flow chart indicating one example of an operation performed by the information processing apparatus according to the embodiment.

FIG. 7 is a flow chart indicating one example of an operation performed by information processing apparatus 100 according to the embodiment.

Obtaining unit 1001 obtains a detection result of an attack on vehicle 50 connected to information processing apparatus 100 (Step S11). For example, obtaining unit 1001 obtains the detection result stored in storage 130 (the detection result before being associated with a processing priority level).

First determining unit 1002 determines whether the attack indicated by the obtained detection result is included in any one of the pieces of threat information stored in threat information server 20 (Step S12). For example, first determining unit 1002 causes threat information server 20 to search for threat information server 20 itself to find out whether a piece of threat information corresponding to the attack indicated by the detection result is included in the pieces of threat information stored in threat information server 20. Details are described later.

When the attack indicated by the detection result is included in any one of the pieces of threat information, second determining unit 1003 determines whether a resolution state to the attack indicated by the detection result included in the one of the pieces of threat information indicates "not resolved" or "resolved" (Step S13). For example, second determining unit 1003 causes threat information server 20 to check what a resolution state to the attack associated with the attack is like in threat information corresponding to the attack indicated by the detection result. Details are described later.

Third determining unit 1004 determines whether a countermeasure application state of vehicle 50 against the attack indicated by the detection result included in vehicle information stored in vehicle information server 30 indicates "not applied" or "applied" (Step S14). For example, third determining unit 1004 causes vehicle information server 30 to check what a countermeasure application state of vehicle 50 against the attack indicated by the detection result is like. Details are described later. For example, storage 1008 stores latest information of countermeasures against attacks on vehicles, and third determining unit 1004 makes the determination by comparing the countermeasure application state of vehicle 50 against the attack indicated by the detection result checked by vehicle information server 30 and the latest information stored in storage 1008. A data structure of the latest information of countermeasures against attacks on vehicles is described with reference to FIG. 11 to be described later.

Fourth determining unit 1005 determines whether an attack count indicated by the detection result is greater than or equal to a predetermined count (Step S15). For example, the predetermined count is decided by a manager, or the like of information processing apparatus 100 as necessary. More specifically, the predetermined count is decided to be equal to an expected count of attacks on vehicles which are prevailing. For example, fourth determining unit 1005 causes threat information server 20 to check the attack count indicated by the detection result. Details are described later. Fourth determining unit 1005 then stores a count obtained by adding 1 to the count checked by threat information server 20 onto attack count memory 1006. In addition, fourth determining unit 1005 sends, to threat information server 20, the count (with the addition of 1) stored in attack count memory 1006, and causes threat information server 20 to update the attack count indicated by the detection result managed in threat information server 20 to the count that fourth determining unit 1005 has sent. In other words, 1 is added to the attack count indicated by the detection result managed in threat information server 20.

Deciding unit 1007 decides a processing priority level of the attack indicated by the detection result, based on the result of the determination made by first determining unit 1002, the result of the determination made by second determining unit 1003, the result of the determination made by third determining unit 1004, and the result of the determination made by fourth determining unit 1005 (Step S16). For example, when the attack indicated by the detection result is included in the one of the pieces of threat information and the resolution state to the attack indicated by the detection result included in the one of the pieces of threat information indicates that the attack has been resolved, deciding unit 1007 decides that the processing priority level is a third priority level lower than the second priority level in the case where the attack count indicated by the detection result is smaller than the predetermined count. In addition, for example, when the attack indicated by the detection result is included in the one of threat information and the resolution state to the attack indicated by the detection result included in the one of the pieces of threat information indicates that the attack has been resolved, deciding unit 1007 decides that the processing priority level is a second priority level lower than a first priority level and higher than a third priority level in the case where the countermeasure application state indicates that any countermeasure has not been applied and the attack count indicated by the detection result is greater than or equal to the predetermined count. In addition, for example, when the attack indicated by the detection result is included in the one of the pieces of threat information and the resolution state to the attack indicated by the detection result included in the one of the pieces of threat information indicates that the attack has been resolved, deciding unit 1007 decides that the processing priority level is a first priority level higher than a second priority level in the case where the countermeasure application state indicates that a countermeasure has been applied and the attack count indicated by the detection result is greater than or equal to the predetermined count. Details of an operation by deciding unit 1007 is described later.

Output unit 1009 outputs the processing priority level decided by deciding unit 1007 (Step S17). For example, output unit 1009 outputs the processing priority level to storage 130, and associates the processing priority level with the detection result before being associated with the processing priority level.

Display controller 1010 then controls content to be displayed in display unit 120 which displays information regarding the attack indicated by the detection result, based on the processing priority level decided by deciding unit 1007 (Step S18). Details of an operation by display controller 1010 is described later.

It is to be noted that information processing apparatus 100 does not always need to be connected to vehicle information server 30 via network 60. In this case, information processing apparatus 100 does not always need to include third determining unit 1004, fourth determining unit 1005, attack count memory 1006, and storage 1008. In addition, in this case, deciding unit 1007 decides a processing priority level of the attack indicated by the detection result, based on the result of the determination made by first determining unit 1002 and the result of the determination made by second determining unit 1003. For example, deciding unit 1007 decides that the processing priority level of the attack indicated by the detection result is a first priority level when the attack indicated by the detection result is not included in any of the pieces of threat information. When the attack indicated by the detection result is included in the one of the pieces of threat information, deciding unit 1007 decides that the processing priority level is a second priority level lower than the first priority level in the case where the resolution state to the attack indicated by the detection result included in the one of the pieces of threat information indicates that the attack has not been resolved; and that the processing priority level is a third priority level lower than the second priority level in the case where the resolution state to the attack indicated by the detection result included in the one of the pieces of threat information indicates that the attack has been resolved. Details of an operation by deciding unit 1007 is described later.

[Configuration of Threat Information Server 20]

Figure 8:
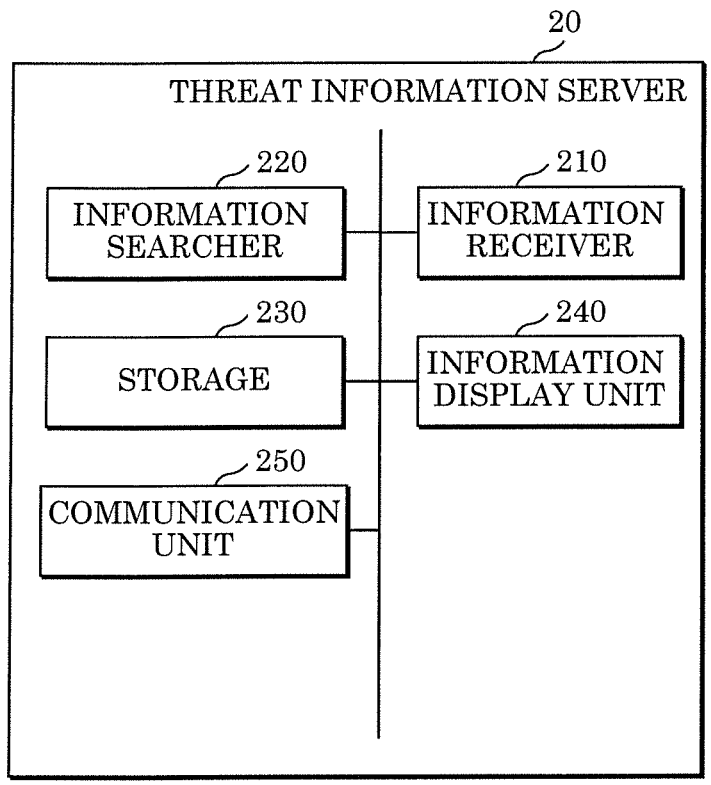
FIG. 8 is a configuration diagram of a threat information server according to the embodiment.

FIG. 8 is a configuration diagram of threat information server 20 according to the embodiment.

Threat information server 20 includes information receiver 210, information searcher 220, storage 230, information display unit 240, and communication unit 250. Each of these constituent elements is implemented as a communication circuit in threat information server 20, a display device such as a display, etc., a memory, a processor which executes a program stored in the memory, or the like.

Communication unit 250 communicates with information processing apparatus 100 via network 60.

Information receiver 210 receives a detection result of an attack on vehicle 50 via communication unit 250. For example, information receiver 210 transforms the received detection result into a predetermined format.

For example, storage 230 stores pieces of threat information each indicating an attack on a vehicle and a resolution state to the attack associated with each other, and information searcher 220 searches whether the attack indicated by the detection result received by information receiver 210 is included in any one of the pieces of threat information stored in storage 230. A data structure of the pieces of threat information is described with reference to FIG. 12 to be described later.

When the attack is not included in any one of the pieces of threat information stored in storage 230, information searcher 220 sends the fact to information processing apparatus 100 via communication unit 250. In addition, information processing apparatus 100 stores the detection result received by information receiver 210, in storage 230 as new piece of threat information.

When the information is included in any one of the pieces of threat information stored in storage 230, information searcher 220 sends the fact to information processing apparatus 100 via communication unit 250. In addition, information searcher 220 sends a resolution state to the attack indicated by the detection result included in the one of the pieces of threat information to information processing apparatus 100 via communication unit 250. In addition, information searcher 220 sends an attack count indicated by detection results to information processing apparatus 100 via communication unit 250.

For example, information display unit 240 displays the pieces of threat information stored in storage 230, in response to a request from a manager, or the like of threat information server 20.

[Configuration of Vehicle Information Server 30]

Figure 9:
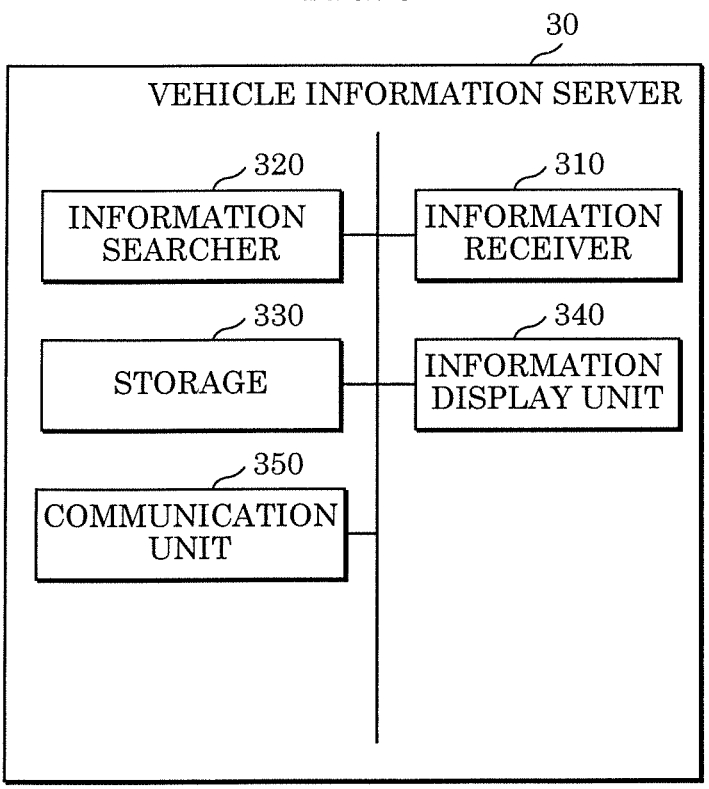
FIG. 9 is a configuration diagram of a vehicle information server according to the embodiment.

FIG. 9 is a configuration diagram of vehicle information server 30 according to the embodiment.

Vehicle information server 30 includes information receiver 310, information searcher 320, storage 330, information display unit 340, and communication unit 350. Each of these constituent elements is implemented as a communication circuit in vehicle information server 30, a display device such as a display, etc., a memory, a processor, or the like which executes a program stored in the memory.

Communication unit 350 communicates with information processing apparatus 100 via network 60.

Information receiver 310 receives an inquiry regarding the countermeasure application state of vehicle 50 against the attack indicated by the detection result via communication unit 350. For example, the inquiry includes a vehicle ID of vehicle 50, owner information of vehicle 50, or the like as information for identifying vehicle 50.

For example, storage 330 stores vehicle information including at least a countermeasure application state of vehicle 50 against the attack on the vehicle, and information searcher 320 checks the countermeasure application state of vehicle 50 against the attack indicated by the detection result included in the vehicle information, based on the inquiry received by information receiver 310. A data structure of vehicle information is described with reference to FIG. 13 to be described later. Information searcher 320 sends the countermeasure application state to information processing apparatus 100 via communication unit 350.

For example, information display unit 340 displays the vehicle information stored in storage 330, in response to a request from a manager, or the like of vehicle information server 30.

Data Structure Examples

Next, a data structure example of detection results of attacks on vehicles, a data structure example of latest information of countermeasures against the attacks on the vehicles, a data structure example of threat information, and a data structure example of vehicle information are described with reference to FIGS. 10 to 14.

FIG. 10 is a diagram indicating one example of the data structure of the detection results before processing priority levels are being associated therewith.

Each of the detection results is generated, for example, when an attack on a vehicle is detected by attack detector 4201 of the vehicle or attack detector 110 of information processing apparatus 100. For example, the detection result includes: an attack detection result ID; a vehicle ID of an attacked vehicle; the model of the attacked vehicle; date and time of the attack; an attack type; an attack channel; a message ID, an attack target in the attacked vehicle, etc. It is to be noted that the message ID is determined by a protocol; the message ID is a CANID when the protocol is CAN, and the message ID is an ID address when the protocol is Ethernet (registered trademark).

FIG. 11 is a diagram indicating one example of the data structure of the latest information of the countermeasures against the attacks.

For example, an attack for taking over functions of a component or an attack for reducing or stopping the functions may be made for each component (for example, an ECU, or the like) of a vehicle. When such an attack on a component is reported by an analyst, or the like, the manufacturer of the component of the vehicle takes a countermeasure against the attack. More specifically, the maker generates a security patch of the component. For example, the latest information of the countermeasure against the attack includes the name of the manufacturer of the component, latest update date and time, and latest update information (specifically, the version of the latest firmware). Information processing apparatus 100 obtains the latest information of the component from the manufacturer, and stores the latest information in, for example, storage 1008.

FIG. 12 is a diagram indicating one example of the data structure of the thread information.

For example, the threat information is information generated by threat information server 20 obtaining the attack detection result from information processing apparatus 100 and formatting the attack detection result as indicated by FIG. 12. At least the attack on the vehicle and the resolution state of the vehicle to the attack are associated with the threat information. For example, in this embodiment, threat information includes: a threat information ID; a resolution state to the attack indicated by the detection result; attack date and time; the model of the attacked vehicle; an attack type; an attack count; an attack channel; a message ID, an attack target in the attacked vehicle, etc. The resolution state becomes "resolved" when the manufacturer of the attack-target component takes a countermeasure against the attack. The attack count is the number of times of attacks on various vehicles detected by information processing apparatus 100 monitoring the various vehicles. In other words, a larger attack count indicates that a larger number of attacks on a larger number of vehicles are prevailing. Although FIG. 12 illustrates an example of three pieces of threat information, threat information server 20 stores a large number of pieces of threat information for each attack.

FIG. 13 is a diagram indicating one example of the data structure of the vehicle information.

The vehicle information is information regarding the vehicle owned by each of persons, and includes at least a countermeasure application state of vehicle 50 connected to information processing apparatus 100 against an attack on the vehicle. For example, in this embodiment, the vehicle information includes: a vehicle ID; owner information; a ride count; the model of a vehicle; the model of the component of the vehicle; the version of firmware currently applied to the component, etc. It is to be noted that the version of the firmware of the component of the vehicle owned by each person is not always the latest one. For example, although the latest firmware version of component "ECU01" is 1.50 as illustrated in FIG. 11, the version of the current firmware of component "ECU01" of a vehicle having a vehicle ID of "CAR-100" is 1.40 which is not the latest one.

FIG. 14 is a diagram indicating one example of the data structure of the detection results after the processing priority levels are being associated therewith.

As illustrated in FIG. 14, it is known that the processing priority levels are further associated with the detection results illustrated in FIG. 10. Processing priority levels include: "high" indicating a first priority level having the highest priority level; "medium" indicating a second priority level having the second highest priority level; and "low" indicating a third priority level having the lowest priority level.

Specific Examples

Next, flows of deciding processing priority levels of detection results are described taking specific examples.

One example of a processing priority level deciding flow in the case where vehicle 50 itself detects an attack on vehicle 50 is described with reference to FIG. 15.

Figure 15:
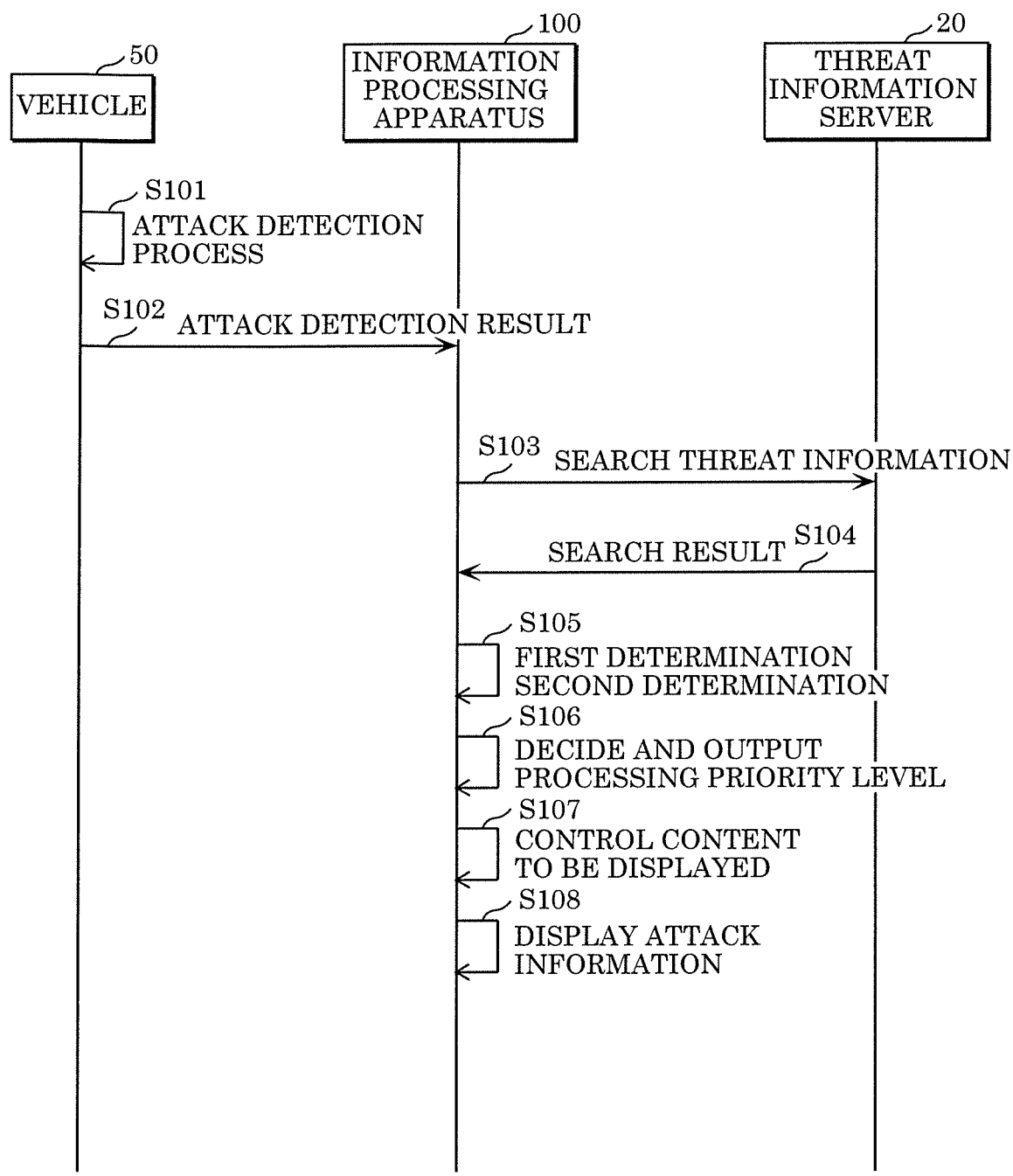
FIG. 15 is a sequence diagram indicating one example of a processing priority level deciding flow in the case where a vehicle according to the embodiment detects an attack.

FIG. 15 is a sequence diagram indicating the one example of the processing priority level deciding flow in the case where vehicle 50 according to the embodiment detects the attack. It is assumed here that information processing apparatus 100 is not connected to vehicle information server 30 via network 60, and does not include third determining unit 1004, fourth determining unit 1005, attack count memory 1006, and storage 1008.

Vehicle 50 detects the attack on vehicle 50 (Step S101), and sends the detection result of the attack to information processing apparatus 100 (Step S102).

Information processing apparatus 100 sends the detection result to threat information server 20 in order to cause threat information server 20 to search threat information server 20 itself to find out whether the attack indicated by the detection result of the attack on vehicle 50 received from vehicle 50 is included in any one of the pieces of threat information stored in threat information server 20 (Step S103).

Threat information server 20 verifies the received detection result with the pieces of threat information stored in threat information server 20, searches threat information server 20 itself to find out whether the attack (that is, the attack on vehicle 50) indicated by the detection result is included in any one of the pieces of threat information, and sends the search result to information processing apparatus 100 (Step S104). For example, threat information server 20 stores the pieces of threat information (pieces of information each assigned with a corresponding one of threat information IDs "A0001", "A0002", "A0008", . . . ) illustrated in FIG. 12, and it is assumed that the detection result corresponding to an attack detection result ID of "B001" in FIG. 10 has been received. In this case, the attack on vehicle 50 is an attack referred to as "Attack A" including a message ID of "0xAA" from "OBD-II" to "ECU01" mounted on a vehicle whose vehicle model is "Model-A". The vehicle model, the attack type, the attack channel, the message ID, and the attack target in the detection result match with those of the piece of threat information having a threat information ID of "A0001" among the pieces of threat information. For this reason, threat information server 20 sends, to information processing apparatus 100, the detection result indicating that the attack on vehicle 50 is included in the piece of threat information. In addition, the resolution state of vehicle 50 to the attack included in the piece of threat information having the threat information ID of "A0001" indicates "resolved". For this reason, threat information server 20 sends also the information indicating that the resolution state of vehicle 50 to the attack included in the piece of threat information is "resolved" at the time when, for example, sending the search result.

Information processing apparatus 100 determines, as a first determination, whether the attack indicated by the detection result is included in any one of the pieces of threat information stored in threat information server 20, and when the attack indicated by the detection result is included in any one of the pieces of threat information stored in threat information server 20, determines, as a second determination, whether a resolution state to the attack indicated by a corresponding one of the detection results which is included in the one of the pieces of threat information indicates "not resolved" or "resolved" (Step S105). For example, information processing apparatus 100 determines whether the attack indicated by the detection result is included in any one of the pieces of threat information stored in threat information server 20, and determines that the resolution state to the attack indicated by the detection result included in the one of the pieces of threat information indicates "resolved".

Information processing apparatus 100 decides a processing priority level of the attack indicated by the detection result based on the result of the first determination and the result of the second determination, and outputs the decided processing priority level (Step S106). Details of the deciding method are described with reference to FIG. 17 to be described later.

Information processing apparatus 100 controls content to be displayed in display unit 120 which displays information regarding the attack indicated by the detection result, based on the decided priority level (Step S107). Details of the control method are described with reference to FIG. 21 to be described later.

Information processing apparatus 100 displays the information regarding the attack indicated by the detection result in display unit 120 in the form of controlled display content (Step S108). Specific display content is described with reference to FIGS. 22B and 22C to be described later.

One example of a processing priority level deciding flow in the case where vehicle 50 itself detects an attack on vehicle 50 is described with reference to FIG. 16.

Figure 16:
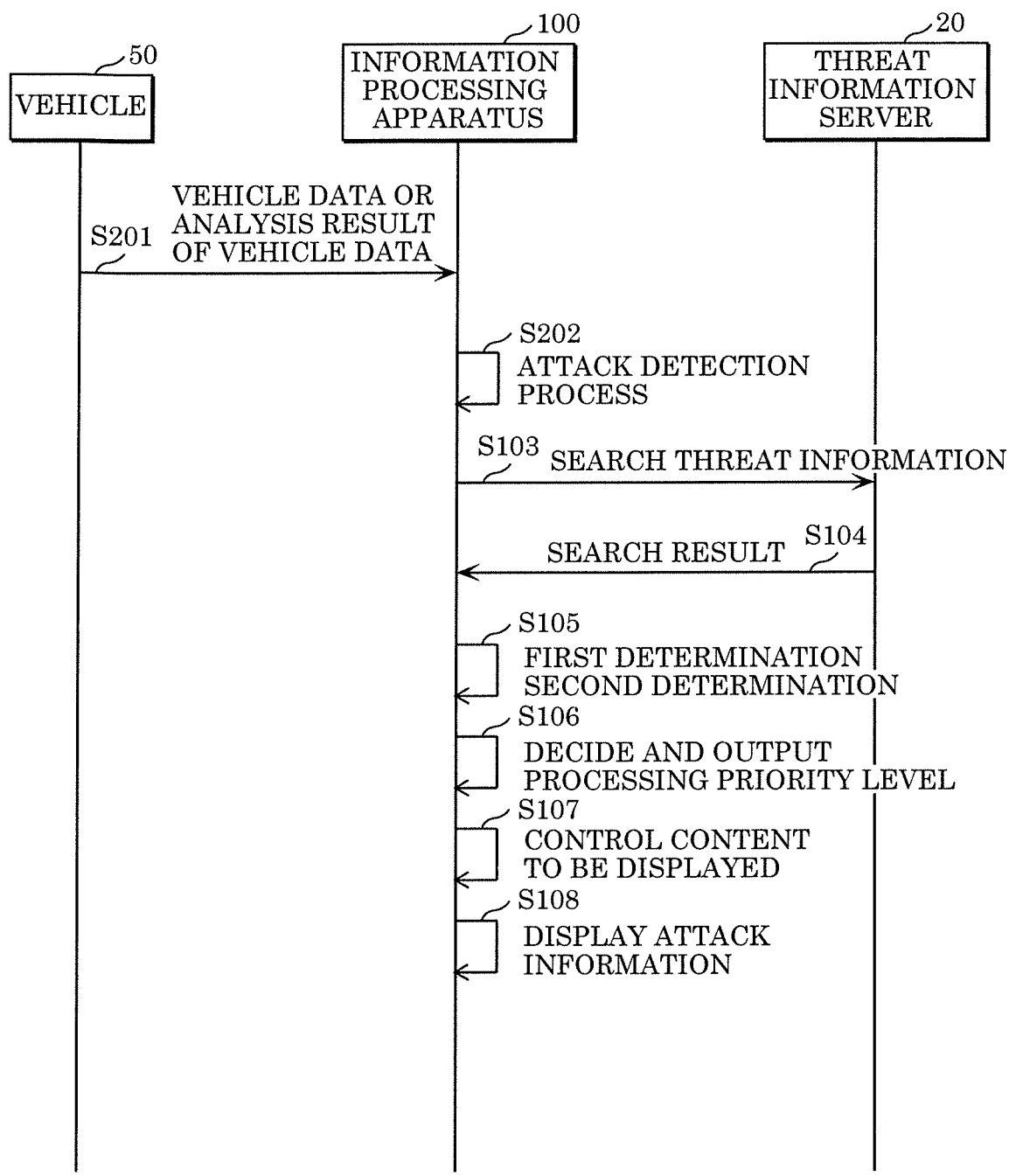
FIG. 16 is a sequence diagram indicating one example of a processing priority level deciding flow in the case where an information processing apparatus according to the embodiment detects an attack.

FIG. 16 is a sequence diagram indicating the one example of the processing priority level deciding flow in the case where information processing apparatus 100 according to the embodiment detects the attack. It is assumed here that information processing apparatus 100 is not connected to vehicle information server 30 via network 60, and does not include third determining unit 1004, fourth determining unit 1005, attack count memory 1006, and storage 1008.

Vehicle 50 sends, to information processing apparatus 100, vehicle data or an analysis result of the vehicle data which flows in on-vehicle network 40 (Step S201).

Information processing apparatus 100 detects the attack on vehicle 50 based on the vehicle data or the analysis data of the vehicle data received (Step S202).

The following processing is the same as the one described with reference to FIG. 15, and thus is not described here.

Figure 17:
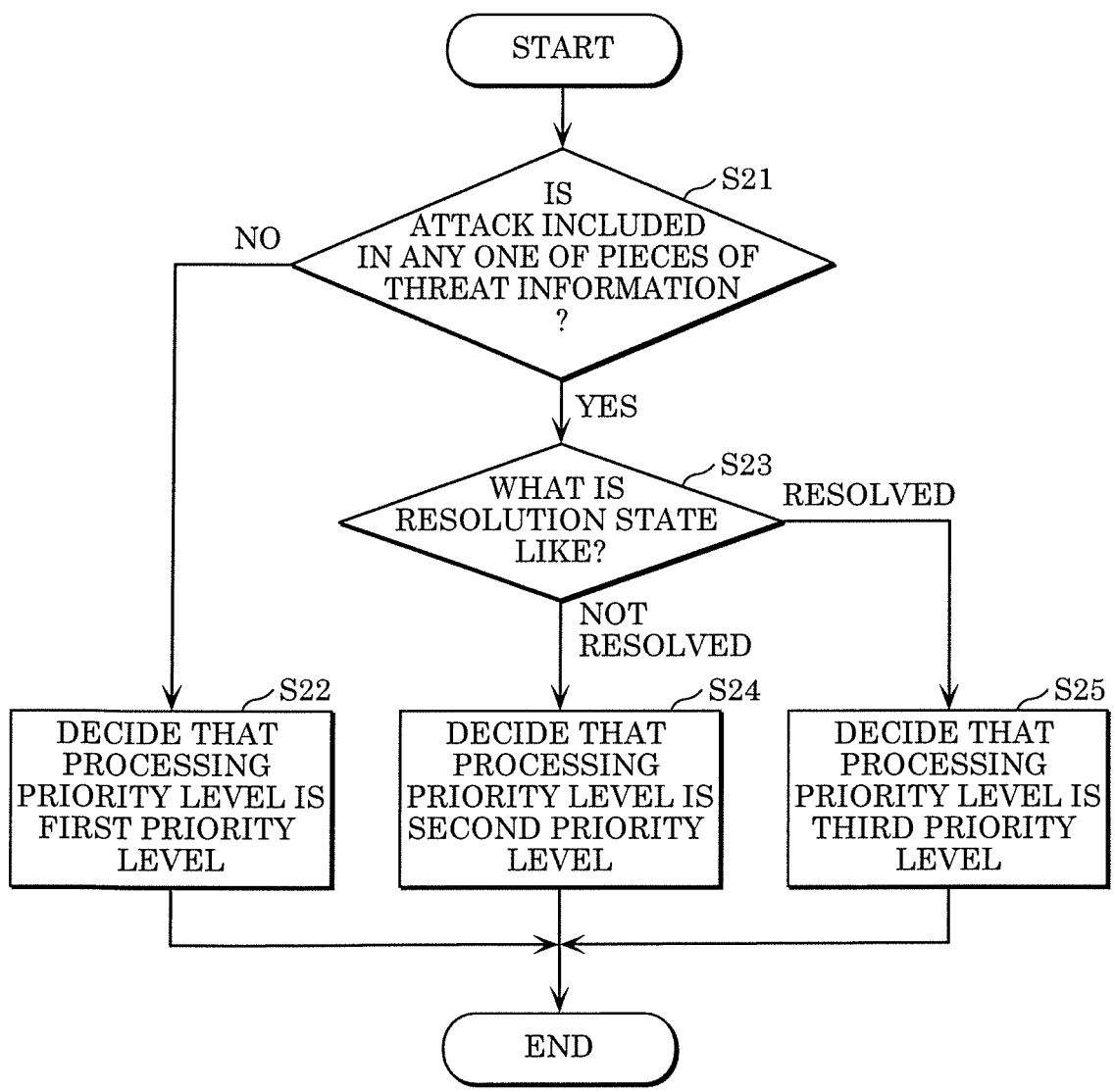
FIG. 17 is a flow chart indicating one example of a processing priority level deciding method performed by the information processing apparatus according to the embodiment.

With reference to FIG. 17, a description is given of a specific example for a processing priority level deciding method in the case where information processing apparatus 100 is not connected to vehicle information server 30 via network 60, and does not include third determining unit 1004, fourth determining unit 1005, attack count memory 1006, and storage 1008.

FIG. 17 is a flow chart indicating one example of a processing priority level deciding method performed by information processing apparatus 100 according to the embodiment.

Information processing apparatus 100 determines whether the attack indicated by the detection result is included in any one of the pieces of threat information stored in threat information server 20 (Step S21).

When the attack indicated by the detection result is not included in any one of the pieces of threat information (No in Step S21), information processing apparatus 100 decides that the processing priority level of the attack indicated by the detection result is a first priority level (Step S22). In this case, the attack received by vehicle 50 is an unknown attack, and thus an early response may be required. Thus, the processing priority level can be set to the first priority level which is the highest priority level.

When the attack indicated by the detection result is included in any one of the pieces of threat information (Yes in Step S21), information processing apparatus 100 determines whether the resolution state to the attack indicated by the detection result included in the one of the pieces of threat information indicates "not resolved" or "resolved" (Step S23).

When the attack indicated by the detection result is included in the one of the pieces of threat information and the resolution state to the attack indicated by the detection result included in the one of the pieces of threat information indicates "not resolved" ("not resolved" in Step S23), information processing apparatus 100 decides that the processing priority level is a second priority level (Step S24). In this case, since the attack that vehicle 50 has received is a known attack but has not been resolved, the processing priority level can be set to the second priority level which is the second highest priority level.

When the attack indicated by the detection result is included in the one of the pieces of threat information and the resolution state to the attack indicated by the detection result included in the one of the pieces of threat information indicates "resolved" ("resolved" in Step S23), information processing apparatus 100 decides that the processing priority level is a third priority level (Step S25). In this case, since the attack received by vehicle 50 has been resolved, the processing priority level can be set to the third priority level which is the lowest priority level.

Next, another one example of a processing priority level deciding flow in the case where vehicle 50 itself detects an attack on vehicle 50 is described with reference to FIG. 18.

Figure 18:
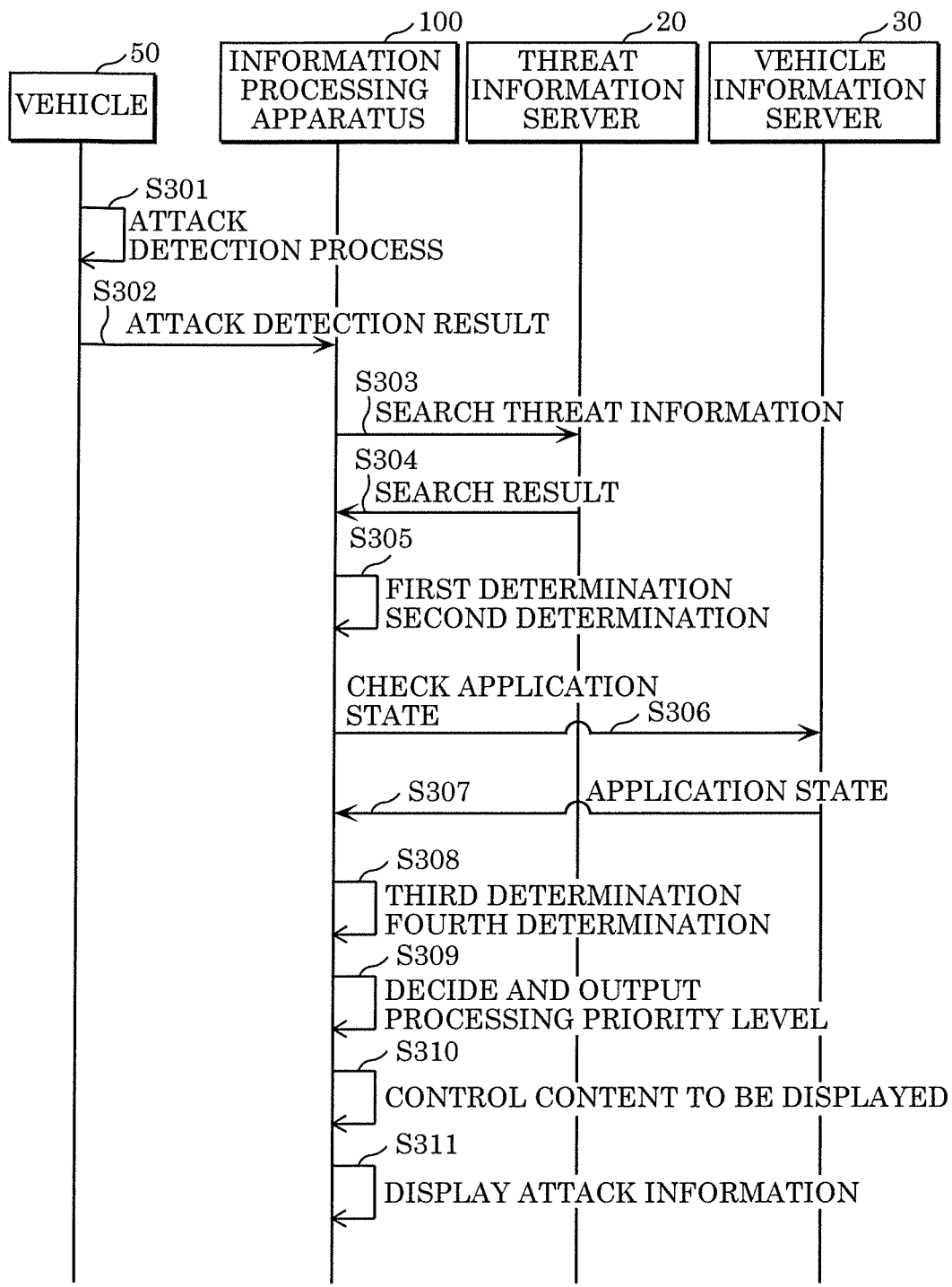
FIG. 18 is a sequence diagram indicating another one example of processing priority level deciding flow in the case where a vehicle according to the embodiment detects an attack.

FIG. 18 is a sequence diagram indicating the one example of the processing priority level deciding flow in the case where vehicle 50 according to the embodiment detects the attack. It is assumed here that information processing apparatus 100 is connected to vehicle information server 30 via network 60, and includes third determining unit 1004, fourth determining unit 1005, attack count memory 1006, and storage 1008.

Vehicle 50 detects an attack on vehicle 50 (Step S301), and sends the detection result of the attack to information processing apparatus 100 (Step S302).

Information processing apparatus 100 sends the detection result to threat information server 20 in order to cause threat information server 20 to search threat information server 20 itself for finding out whether the attack indicated by the detection result of the attack on vehicle 50 received from vehicle 50 is included in any one of the pieces of threat information stored in threat information server 20 (Step S303).

Threat information server 20 verifies the received detection result with the pieces of threat information stored in threat information server 20, searches threat information server 20 itself to find out whether the attack (that is, the attack on vehicle 50) indicated by the detection result is included in any one of the pieces of threat information, and sends the search result to information processing apparatus 100 (Step S304). For example, as in the description with reference to FIG. 16, threat information server 20 sends, to information processing apparatus 100, the detection result indicating that the attack on vehicle 50 is included in any one of the pieces of threat information and information indicating that the resolution state to the attack on vehicle 50 indicates "resolved". Threat information server 20 further sends, to information processing apparatus 100, an attack count of the same attack on vehicle 50 (for example, 20 times in the case of the attack having a threat information ID of "A0001" illustrated in FIG. 12).

Information processing apparatus 100 determines, as a first determination, whether the attack indicated by the detection result is included in any one of the pieces of threat information stored in threat information server 20, and when the attack indicated by the detection result is included in the one of the pieces of threat information, determines, as a second determination, whether a resolution state to the attack indicated by the detection results included in the one of the pieces of threat information indicates "not resolved" or "resolved" (Step S305). For example, information processing apparatus 100 determines that the attack indicated by the detection result is included in the one of the pieces of threat information stored in threat information server 20, and determines that the resolution state to the attack indicated by the detection result included in the one of the pieces of threat information indicates "resolved".

Information processing apparatus 100 sends, to vehicle information server 30, information for identifying vehicle 50 such as the vehicle ID of vehicle 50, owner information of vehicle 50, in order to cause vehicle information server 30 to check the countermeasure application state of vehicle 50 against the attack indicated by the detection result included in the one of the vehicle information stored in vehicle information server 30 (Step S306).

Vehicle information server 30 verifies the received information for identifying vehicle 50 with the vehicle information stored in vehicle information server 30 to check the countermeasure application state of vehicle 50 against the attack on the vehicle, and sends the application state to information processing apparatus 100 (Step S307). For example, it is assumed that vehicle information server 30 stores vehicle information (vehicle IDs of "CAR-100", "CAR-101", "CAR-102", . . . ) indicated in FIG. 13, and that "CAR-100" is received as the vehicle ID of vehicle 50 that has received the attack (for example, the attack having an attack detection result ID of "B001" illustrated in FIG. 10). In this way, as for vehicle 50 having a vehicle ID of "CAR-100" indicated in FIG. 13, it is possible to confirm the countermeasure application states against the attack are as follows: the firmware version of component "ECU01" is 1.40; the firmware version of component "ECU02" is 2.10; and the firmware version of component "ECU50" is 3.20. Vehicle information server 30 sends such application states to information processing apparatus 100.

Although the processes in Step S306 and Step S307 are performed after the process in Step S305, it is to be noted that these processes may be performed before the process in Step S305.

Information processing apparatus 100 determines, as a third determination, whether a countermeasure application state of vehicle 50 against the attack indicated by the detection result included in the one of the vehicle information stored in vehicle information server 30 indicates "not applied" or "applied", and determines, as a fourth determination, whether the attack count indicated by the detection result is greater than or equal to a predetermined count (Step S308). For example, as for information processing apparatus 100, the firmware version as the countermeasure application state against the attack on component "ECU01" of vehicle 50 having a vehicle ID of "CAR-100" is 1.4 as indicated in FIG. 13 while the latest firmware version for component "ECU01" is 1.50 as indicated in FIG. 11. In other words, the countermeasure against the attack on vehicle 50 is not the latest one. For this reason, information processing apparatus 100 determines that the countermeasure application state of vehicle 50 against the attack indicated by the detection result indicates "not applied". In addition, for example, when the predetermined count is decided as count 10, information processing apparatus 100 determines that the attack count (count 20) indicated by the detection result is greater than or equal to the predetermined count.

Information processing apparatus 100 decides a processing priority level of the attack indicated by the detection result based on the result of the first determination, the result of the second determination, the result of the third determination, and the result of the fourth determination, and outputs the decided processing priority level (Step S309). Details of the deciding method are described with reference to FIG. 20 to be described later.

Information processing apparatus 100 controls content to be displayed in display unit 120 which displays information regarding the attack indicated by the detection result, based on the decided priority level (Step S310). Details of the control method are described with reference to FIG. 21 to be described later.

Information processing apparatus 100 displays the information regarding the attack indicated by the detection result in display unit 120 in the form of controlled display content (Step S311). Specific display content is described with reference to FIGS. 22B and 22C to be described later.

Another one example of a processing priority level deciding flow in the case where vehicle 50 itself detects an attack on vehicle 50 is described with reference to FIG. 19.

Figure 19:
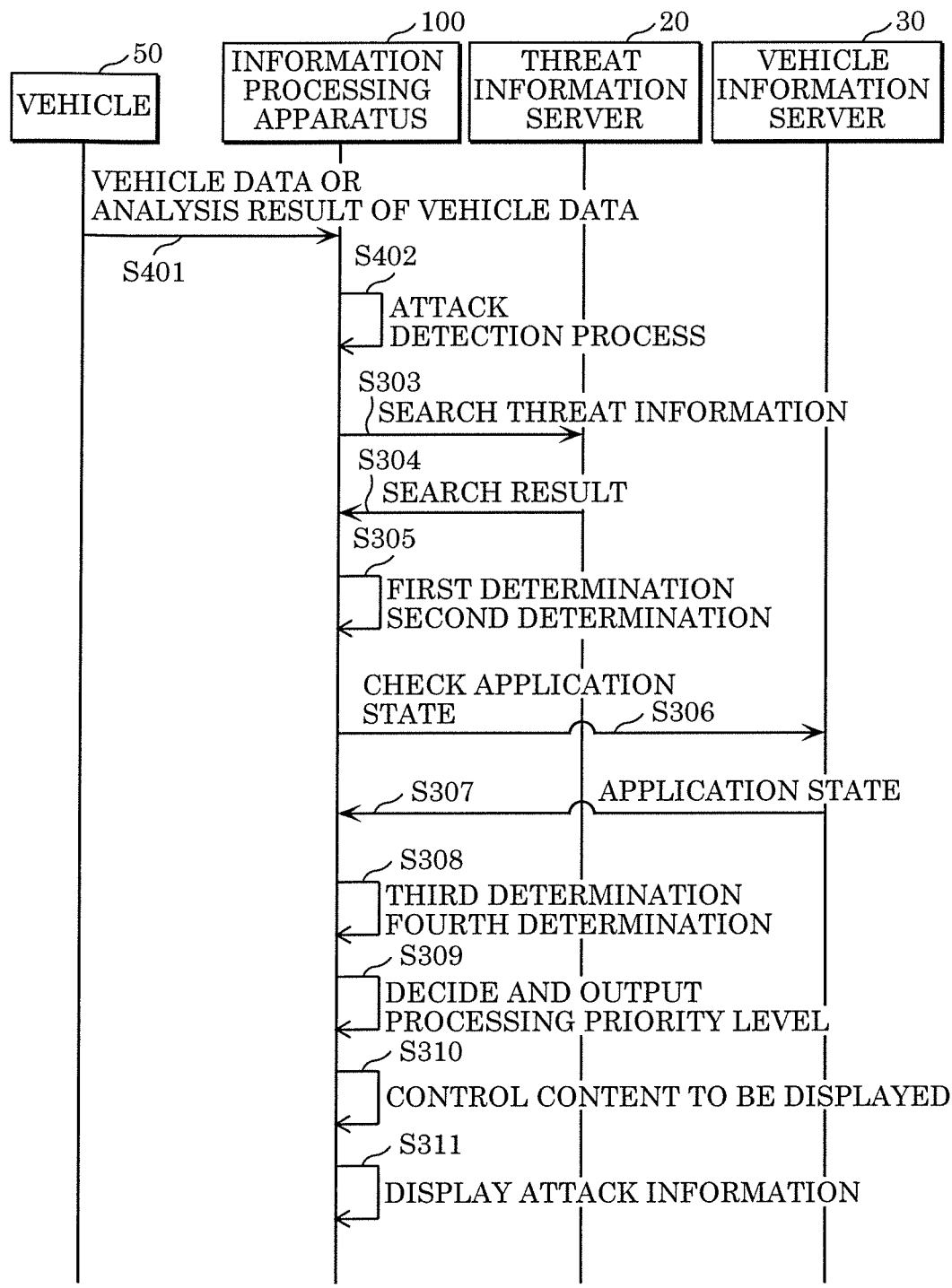
FIG. 19 is a sequence diagram indicating another one example of processing priority level deciding flow in the case where an information processing apparatus according to the embodiment detects an attack.

FIG. 19 is a sequence diagram indicating the other one example of the processing priority level deciding flow in the case where information processing apparatus 100 according to the embodiment detects the attack. It is assumed here that information processing apparatus 100 is connected to vehicle information server 30 via network 60, and includes third determining unit 1004, fourth determining unit 1005, attack count memory 1006, and storage 1008.

Vehicle 50 sends, to information processing apparatus 100, vehicle data or an analysis result of the vehicle data which flows in on-vehicle network 40 (Step S401).

Information processing apparatus 100 detects the attack on vehicle 50 based on the vehicle data or the analysis data of the vehicle data received (Step S402).

The following processing is the same as the one described with reference to FIG. 18, and thus is not described here.

Figure 20:
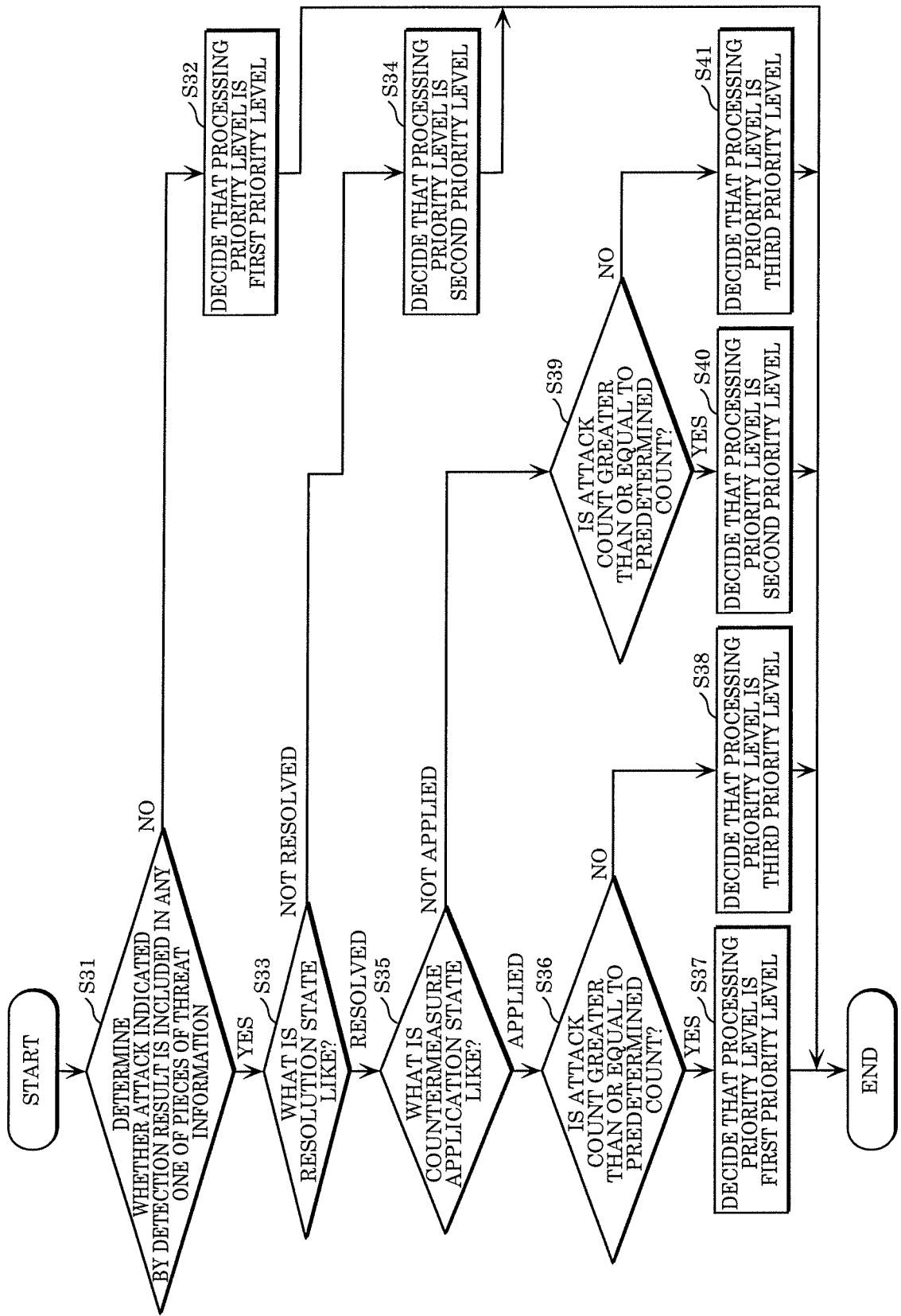
FIG. 20 is a flow chart indicating another one example of a processing priority level deciding method performed by the information processing apparatus according to the embodiment.

With reference to FIG. 20, a description is given of a specific example for a processing priority level deciding method in the case where information processing apparatus 100 is connected to vehicle information server 30 via network 60, and includes third determining unit 1004, fourth determining unit 1005, attack count memory 1006, and storage 1008.

FIG. 20 is a flow chart indicating the other one example of the processing priority level deciding method performed by information processing apparatus 100 according to the embodiment.

Information processing apparatus 100 determines whether the attack indicated by the detection result is included in any one of the pieces of threat information stored in threat information server 20 (Step S31).

When the attack indicated by the detection result is not included in any one of the pieces of threat information (No in Step S31), information processing apparatus 100 decides that the processing priority level of the attack indicated by the detection result is a first priority level (Step S32). In this case, the attack received by vehicle 50 is an unknown attack, and thus an early response may be required. Thus, the processing priority level can be set to the first priority level which is the highest priority level.

When the attack indicated by the detection result is included in any one of the pieces of threat information (Yes in Step S31), information processing apparatus 100 determines whether the resolution state to the attack indicated by the detection result included in the one of the pieces of threat information indicates "not resolved" or "resolved" (Step S33).

When the attack indicated by the detection result is included in the one of the pieces of threat information and the resolution state to the attack indicated by the detection result included in the one of the pieces of threat information indicates "not resolved" ("not resolved" in Step S33), information processing apparatus 100 decides that the processing priority level is a second priority level (Step S34). In this case, the attack received by vehicle 50 is a known attack but has not been resolved, the processing priority level can be set to the second priority level which is the second highest priority level.

When the attack indicated by the detection result is included in the one of the pieces of threat information and the resolution state to the attack indicated by the detection result included in the one of the pieces of threat information indicates "resolved" ("resolved" in Step S33), information processing apparatus 100 determines whether the countermeasure application state of vehicle 50 against the attack indicated by the detection result included in the vehicle information stored in vehicle information server 30 indicates "not applied" or "applied" (Step S35).

In addition, information processing apparatus 100 determines whether the attack count indicated by the detection result is greater than or equal to the predetermined count regardless of whether the countermeasure application state of vehicle 50 against the attack is "not applied" or "applied" (Step S36 or Step S39). It is to be noted that the countermeasure application state of vehicle 50 may be determined after the determination on whether the attack count indicated by the detection result is greater than or equal to the predetermined count.

In the case where the application state indicates "not applied" ("not applied" in Step S35) and the attack count indicated by the detection result is greater than or equal to the predetermined count (Yes in Step S39), when the attack indicated by the detection result is included in the one of the pieces of threat information and the resolution state to the attack indicated by the detection result included in the one of the pieces of threat information indicates "resolved", information processing apparatus 100 decides that the processing priority level is the second priority level (Step S40). In this case, the attack received by vehicle 50 is a known attack and has been already resolved, however, it is considered that the attack is prevailing and any countermeasure against the attack has not been resolved to vehicle 50. In this case, there is a fear that any countermeasure against the attack has not been applied to a large number of vehicles. Thus, the processing priority level can be set to the second priority level which is the second highest priority level.

In the case where the application state indicates "applied" ("applied" in Step S35) and the attack count indicated by the detection result is greater than or equal to the predetermined count (Yes in Step S36) when the attack indicated by the detection result is included in any one of the pieces of threat information and the resolution state to the attack indicated by the detection result included in the one of the pieces of threat information indicates "resolved", information processing apparatus 100 decides that the processing priority level is the first priority level (Step S37). In this case, it is considered that the attack is prevailing and the attack has been detected by vehicle 50 although the countermeasure against the attack has been applied to vehicle 50 prior to the detection. In this case, there is a fear that the countermeasure against the attack does not work. Thus, the processing priority level can be set to the first priority level which is the highest priority level.

In the case where the attack count indicated by the detection result is smaller than the predetermined count (No in Step S36 or Step S39) when the attack indicated by the detection result is included in the one of the pieces of threat information and the resolution state to the attack indicated by the detection result included in the one of the pieces of threat information indicates "resolved", information processing apparatus decides that the processing priority level is the third priority level (Step S38 or Step S41). In other words, the priority level is decided to be the third priority level when the attack count indicated by the detection result is smaller than the predetermined count regardless of whether the countermeasure application state of vehicle 50 against the attack is "not applied" or "applied". In this case, it is considered that the attack received by vehicle 50 is a known attack and has already been resolved, and further that the attack is not prevailing. For this reason, in this case, the processing priority level can be set to the third priority level which is the lowest priority level.

Next, a method for controlling content to be displayed in display unit 120, based on the decided processing priority is described taking a specific example.

Figures 21, 22A:
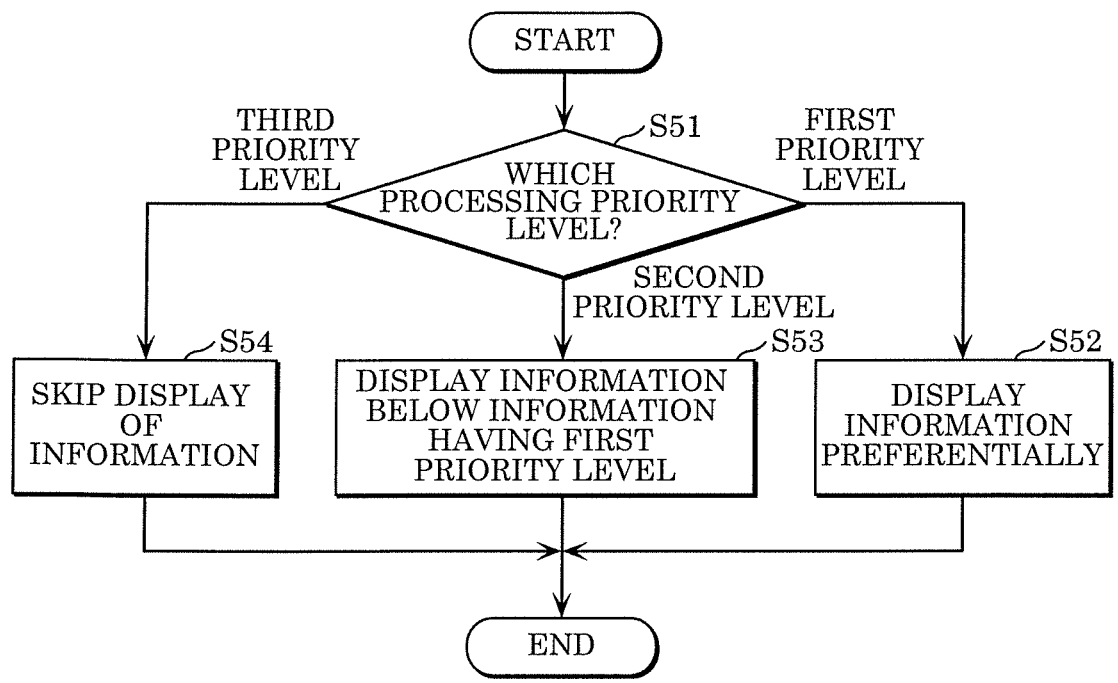
FIG. 21 is a flow chart indicating a specific example of a method for controlling content to be displayed in a display unit of the information processing apparatus according to the embodiment.
FIG. 22A is a diagram indicating one example of content displayed in a display unit according to a comparative example.

FIG. 21 is a flow chart indicating the specific example of the method for controlling content to be displayed in display unit 120 of information processing apparatus 100 according to the embodiment.

Information processing apparatus 100 determines which one of the first priority level, the second priority level, and the third priority level is the decided processing priority level (Step S51).

When the decided processing priority level is the first priority level (the first priority level in Step S51), information processing apparatus 100 controls content to be displayed in display unit 120 in such a manner that the information regarding the attack indicated by the detection result having the processing priority level that has been decided to be the first priority level preferentially over the information regarding the attack indicated by the detection result having the processing priority level that has been decided to be the second priority level and the information regarding the attack indicated by the detection result having the processing priority level that has been decided to be the third priority level (Step S52). Since the detection result indicating the attack having the first priority level which is the highest processing priority level is displayed preferentially, for example, it is easy for an analyst to preferentially perform processing of the detection result indicating the attack.

When the decided processing priority level is the second priority level (the second priority level in Step S51), information processing apparatus 100 controls content to be displayed in display unit 120 in such a manner that the information regarding the attack indicated by the detection result having the processing priority level that has been decided to be the second priority level below the information regarding the attack indicated by the detection result having the processing priority level that has been decided to be the first priority level (Step S53). The detection result indicating the attack having the first priority level that is the highest processing priority level can be displayed preferentially, and the detection result indicating the attack having the second priority level that is the second highest processing priority level can be displayed below the former detection result.

When the decided processing priority level is the third priority level (the third priority level in Step S51), information processing apparatus 100 controls content to be displayed in display unit 120 in such a manner that the information regarding the attack indicated by the detection result having the processing priority level that has been decided to be the third priority level is not displayed (Step S54). Since the detection result indicating the attack having the third priority level that is the lowest processing priority level is not displayed, for example, it is easy for the analyst to preferentially perform processing of the detection result indicating the attack having the higher processing priority level.

Next, content to be displayed in display unit 120 is described taking a specific example.

FIG. 22A is a diagram indicating one example of content displayed in display unit 120 according to a comparative example.

Conventionally, when an attack for repeating access numerous times has occurred and a large number of same attacks have been made, in the case where the attack is evaluated to be highly risky and have a high processing priority level, a large number of detection results of the attacks are displayed in display unit 120 as indicated in FIG. 22A. At this time, the analyst can take a countermeasure against the attack by only processing only one of the large number of detection results. For example, it is only necessary for the analyst to process only, for example, the attack having an Event ID of "001" among the same attacks each having a corresponding one of Event IDs "001", "009", and "010"; and it is only necessary for the analyst to process only, for example, the attack having an Event ID of "002" among the same attacks each having a corresponding one of Event IDs "002" to "008". Nevertheless, conventionally, the large number of detection results of the attacks are evenly assigned with high priority levels and are presented to the analyst. For this reason, the analyst has to take trouble of, for example, manually reassigning the priority levels of the others assuming that the same remaining attacks do not need to be processed.

In view of this, according to the present disclosure, content to be displayed in display unit 120 is, for example, the one as indicated in FIG. 22B or FIG. 22C.

FIG. 22B is a diagram indicating one example of content displayed in display unit 120 according to the embodiment. FIG. 22C is a diagram indicating another one example of content displayed in display unit 120 according to the embodiment. It is to be assumed here that information regarding an attack indicated by a detection result is, for example, information including date and time of the attack, a processing priority level, an attack target, and an attack type.

For example, as indicated in FIG. 22B, a piece of information regarding the attack indicated by the detection result having the processing priority level that has been decided to be the first priority level (High) is displayed preferentially to pieces of information regarding the attacks indicated by the detection results having the processing priority levels that have been decided to be the second priority level (Medium) and the third priority level (Low). More specifically, the information regarding the attack indicated by the detection result decided to have the second priority level is displayed below the information regarding the attack indicated by the detection result decided to have the first priority level in a hierarchical manner so that the detection result having the first priority level is more noticeable than the detection result having the second priority level. In addition, the information regarding the attack indicated by the detection result decided to have the third priority level is not displayed.

Alternatively, for example, as indicated in FIG. 22C, only the piece of information regarding the attack indicated by the detection result decided to have the first priority level may be displayed, and the pieces of information regarding the attacks indicated by the detection results decided to have the second priority level and the third priority level may not be displayed.

It is to be noted that content to be displayed is not limited to the one indicated in FIGS. 22B and 22C as long as the detection result having the first priority level is displayed preferentially to the detection results having the second priority level and the third priority level.

CONCLUSION

As described above, the processing priority level of the attack is decided based on the determination result as to whether the attack indicated by the detection result (that is, the attack that vehicle 50 has received) is included in any one of the pieces of threat information stored in threat information server 20 (in other words, whether the attack on vehicle 50 has been detected previously) and based also on the determination result as to whether the attack has not been resolved or already resolved. For this reason, when a large number of same and unknown attacks are made, the first attack among the large number of attacks is determined not to be included in any one of the pieces of threat information stored in threat information server 20. The piece of threat information regarding the first attack is stored in threat information server 20, and thus the secondary attack and the following attacks are determined to be included in the piece of threat information stored in threat information server 20. Accordingly, among the large number of attacks, the determination result obtained for the first attack and the determination results obtained for the second and following attacks are different, and different processing priority levels can be set for the attacks. Furthermore, different processing priority levels can be set depending on determinations as to whether the attacks have not been resolved or already resolved. In this way, it is possible to efficiently decide the processing priority levels of the attacks on vehicle 50, based on the past detection states of attacks on vehicle 50 and the resolution state to the attacks on vehicle 50.

The processing priority level for each attack is decided: based on the determination result as to whether the attack indicated by the detection result is included in any one of the pieces of threat information stored in threat information server 20 and the determination result as to whether the attack has not been resolved or already resolved; and further based on the countermeasure application state against the attack included in the vehicle information stored in vehicle information server 30 indicates "not applied" or "applied" (in other words, whether a countermeasure against the attack on vehicle 50 has been applied to vehicle 50) and the determination result as to whether the attack count is greater than or equal to the predetermined count (in other words, whether the same attack as the attack that vehicle 50 has received has been received also by other vehicles, and the attacks are prevailing). In this way, finer conditions for deciding processing priority levels are set, which makes it possible to decide processing priority levels of attacks on vehicle 50 in a finer manner.

Other Embodiments

The above embodiment has been described as an example of a technique according to the present disclosure. However, the technique according to the present disclosure is not limited to the above described one, and is applicable to embodiments obtainable by performing modification, replacement, addition, omission, etc. to the embodiment. For example, variations as described below are encompassed by one or more embodiments of the present disclosure.

For example, information processing apparatus 100 does not always need to include display controller 1010. Content to be displayed in display unit 120 may be controlled by another apparatus based on processing priority levels output from information processing apparatus 100.

It is to be noted that the present disclosure can be implemented not only as information processing apparatus 100 but also as an information processing method including the steps (processes) performed by the respective constituent elements of information processing apparatus 100.

An information processing method executed by a processor included in information processing apparatus 100. Information processing apparatus 100 is connected to one or more vehicles 50 and threat information server 20 via a network. Threat information server 20 stores pieces of threat information each indicating an attack on a vehicle and a resolution state to the attack associated with each other. As illustrated in FIG. 7, the information processing method includes the steps of obtaining a detection result of an attack on one of the one or more vehicles 50 connected to information processing apparatus 100 (Step S11); (i) determining whether the attack indicated by the detection result is included in any one of the pieces of threat information stored in threat information server 20 (Step S12); (ii) when the attack indicated by the detection result is included in any one of the pieces of threat information, determining whether the resolution state to the attack indicated by the detection result included in the one of the pieces of threat information indicates that the attack has not been resolved or indicates that the attack has been resolved (Step S13); deciding a processing priority level of the attack indicated by the detection result, based on a determination result obtained in step (i) and a determination result obtained in step (ii) (Step S16); and outputting the processing priority level decided (Step S17).

For example, the steps in the information processing method may be executed by a computer (computer system). In addition, the present disclosure can be implemented as a program causing a computer to execute the steps included in the information processing method.

Furthermore, the present disclosure can be implemented as a non-transitory computer-readable recording medium such as a CD-ROM having the program recorded thereon.

For example, when the present disclosure is implemented as a program (software item), the steps are executed by means of the program being executed using hardware resources such as a CPU of a computer, a memory, an input/output circuit, etc. In other words, the steps are executed by means of, for example, the CPU obtaining data from the memory or the input/output circuit, etc., and computing, and outputting the computation result to the memory or the input/output circuit, etc.

Each of the elements included in information processing apparatus 100 according to the above embodiment may be implemented as an exclusive or general purpose circuit.

Each of the elements included in information processing apparatus 100 according to the above embodiment may be implemented as a large scale integration (LSI) which is an integrated circuit (IC).

The integrated circuit is not limited to the LSI, and may be implemented as an exclusive or general purpose processor. It is also possible to use a field programmable gate array (FPGA) that is programmable or a reconfigurable processor in which connections and settings of circuit cells within the LSI are reconfigurable.

Furthermore, when a circuit integration technology for replacing LSIs with new circuits appears in the future with advancement in semiconductor technology and derivative other technologies, the circuit integration technology may be naturally used to integrate the elements included in information processing apparatus 100.

In addition, the present disclosure covers embodiments which can be obtained by adding, to the embodiments, various kinds of modifications that would be arrived at by a person skilled in the art and embodiments which can be implemented by arbitrarily combining the constituent elements and functions in the embodiments within the scope of the present disclosure.

INDUSTRIAL APPLICABILITY

The present disclosure is applicable to apparatuses which monitor attacks on vehicles.

What is claimed is:

1. An information processing apparatus connected to one or more vehicles and a threat information server via a network, the threat information server storing at least one piece of threat information, each of the at least one piece of threat information indicating an attack on a vehicle and a resolution state to the attack associated with each other, the information processing apparatus comprising:
   a processor; and
   a memory including at least one set of instructions that, when executed by the processor, causes the processor to perform operations including:
   obtaining a detection result of an attack on one of the one or more vehicles connected to the information processing apparatus;
   (a) determining whether the attack indicated by the detection result is included in any one of the at least one piece of threat information stored in the threat information server;
   (b) when the attack indicated by the detection result is included in any one of the at least one piece of threat information, determining whether the resolution state to the attack indicated by the detection result included in the one of the at least one piece of threat information indicates that the attack has not been resolved or indicates that the attack has been resolved;
   (c) deciding a processing priority level of the attack indicated by the detection result, based on a determination result obtained in operation (a) and a determination result obtained in operation (b); and
   (d) outputting the processing priority level decided in operation (c), wherein in operation (c):
the processing priority level of the attack indicated by the detection result is decided to be a first priority level when the attack indicated by the detection result is not included in any of the at least one piece of threat information; and
when the attack indicated by the detection result is included in the one of the at least one piece of threat information:
the processing priority level is decided to be a second priority level lower than the first priority level in the case where the resolution state to the attack indicated by the detection result included in the one of the at least one piece of threat information indicates that the attack has not been resolved; and
the processing priority level is decided to be a third priority level lower than the second priority level in the case where the resolution state to the attack indicated by the detection result included in the one of the at least one piece of threat information indicates that the attack has been resolved.

2. The information processing apparatus according to claim 1,
wherein the information processing apparatus is further connected, via the network, to a vehicle information server which stores vehicle information including at least a countermeasure application state of the one of the one or more vehicles connected to the information processing apparatus, the countermeasure application state indicating whether a countermeasure has been applied against the attack on a vehicle,
the operations further include:
(e) determining whether the countermeasure application state against the attack indicated by the detection result included in the vehicle information stored in the vehicle information server indicates that any countermeasure has not been applied or a countermeasure has been applied; and
(f) determining whether an attack count indicated by the detection result is greater than or equal to a predetermined count, and
in operation (c), the processing priority level is decided based on the determination result obtained in operation (a), the determination result obtained in operation (b), a determination result obtained in operation (e), and a determination result obtained in operation (f).

3. The information processing apparatus according to claim 2,
wherein, in operation (c), when the attack indicated by the detection result is included in the one of the at least one piece of threat information and the resolution state to the attack indicated by the detection result included in the one of the at least one piece of threat information indicates that the attack has been resolved, the processing priority level is decided to be a third priority level lower than the second priority level in the case where the attack count indicated by the detection result is smaller than the predetermined count.

4. The information processing apparatus according to claim 2,
wherein, in operation (c), when the attack indicated by the detection result is included in the one of threat information and the resolution state to the attack indicated by the detection result included in the one of the at least one piece of threat information indicates that the attack has been resolved, the processing priority level is decided to be a second priority level lower than a first priority level and higher than a third priority level in the case where the countermeasure application state indicates that any countermeasure has not been applied and the attack count indicated by the detection result is greater than or equal to the predetermined count.

5. The information processing apparatus according to claim 2,
wherein, in operation (c), when the attack indicated by the detection result is included in the one of the at least one piece of threat information and the resolution state to the attack indicated by the detection result included in the one of the at least one piece of threat information indicates that the attack has been resolved, the processing priority level is decided to be a first priority level higher than a second priority level in the case where the countermeasure application state indicates that a countermeasure has been applied and the attack count indicated by the detection result is greater than or equal to the predetermined count.

6. The information processing apparatus according to claim 1,
the operations further include:
(g) controlling content to be displayed in a display unit which displays pieces of information each regarding the attack indicated by the detection result, based on the processing priority level decided in operation (c),
wherein, in operation (g):
the content to be displayed in the display unit is controlled in such a manner that a first piece of information is displayed preferentially to both a second piece of information and a third piece of information, the first piece of information being a piece of information regarding the attack indicated by the detection result having the processing priority level that has been decided to be a first priority level, the second piece of information being a piece of information regarding the attack indicated by the detection result having the processing priority level that has been decided to be a second priority level lower than the first priority level, the third piece of information being a piece of information regarding the attack indicated by the detection result having the processing priority level that has been decided to be a third priority level lower than the second priority level; and
the content to be displayed in the display unit is further controlled in such a manner that the third piece of information is not displayed.

7. The information processing apparatus according to claim 1,
in the deciding,
deciding the processing priority level of the attack indicated by the detection result, based on the determination result obtained in operation (a) and the determination result obtained in operation (b), when the attack indicated by the detection result is included in any one of the at least one piece of threat information, and
deciding the processing priority level of the attack indicated by the detection result, based on the determination result obtained in operation (a), when the attack indicated by the detection result is not included in the at least one piece of threat information.

8. The information processing apparatus according to claim 1,
wherein the operations further include:
(f) determining whether an attack count indicated by the detection result is greater than or equal to a predetermined count, and in operation (c), the processing priority level is decided based on the determination result obtained in operation (a), the determination result obtained in operation (b), and a determination result obtained in operation (f).

9. The information processing apparatus according to claim 8, in the deciding, deciding the processing priority level of the attack indicated by the detection result, based on the determination result obtained in operation (a), the determination result obtained in operation (b) and the determination result obtained in operation (f), when the attack indicated by the detection result is included in any one of the at least one piece of threat information, and deciding the processing priority level of the attack indicated by the detection result, based on the determination result obtained in operation (a) and the determination result obtained in operation (f), when the attack indicated by the detection result is not included in the at least one piece of threat information.

10. An information processing method executed by a processor included in an information processing apparatus, the information processing apparatus being connected to one or more vehicles and a threat information server via a network, the threat information server storing at least one piece of threat information, each of the at least one piece of threat information indicating an attack on a vehicle and a resolution state to the attack associated with each other, the information processing method comprising the steps of:

obtaining a detection result of an attack on one of the one or more vehicles connected to the information processing apparatus;

(i) determining whether the attack indicated by the detection result is included in any one of the at least one piece of threat information stored in the threat information server;

(ii) when the attack indicated by the detection result is included in any one of the at least one piece of threat information, determining whether the resolution state to the attack indicated by the detection result included in the one of the at least one piece of threat information indicates that the attack has not been resolved or indicates that the attack has been resolved;

deciding a processing priority level of the attack indicated by the detection result, based on a determination result obtained in step (i) and a determination result obtained in step (ii); and outputting the processing priority level decided, wherein in the deciding:

the processing priority level of the attack indicated by the detection result is decided to be a first priority level when the attack indicated by the detection result is not included in any of the at least one piece of threat information; and when the attack indicated by the detection result is included in the one of the at least one piece of threat information:

the processing priority level is decided to be a second priority level lower than the first priority level in the case where the resolution state to the attack indicated by the detection result included in the one of the at least one piece of threat information indicates that the attack has not been resolved; and the processing priority level is decided to be a third priority level lower than the second priority level in the case where the resolution state to the attack indicated by the detection result included in the one of the at least one piece of threat information indicates that the attack has been resolved.

11. A non-transitory computer-readable recording medium storing a program causing the information processing apparatus recited in claim 8 to execute the information processing method recited in claim 10.

* * * * *